United States Patent
Yap

(10) Patent No.: US 9,405,534 B2
(45) Date of Patent: Aug. 2, 2016

(54) COMPOUND COMPLEX INSTRUCTION SET COMPUTER (CCISC) PROCESSOR ARCHITECTURE

(71) Applicant: Tom Yap, Centennial, CO (US)

(72) Inventor: Tom Yap, Centennial, CO (US)

(*) Notice: Subject to any disclaimer, the term of this patent is extended or adjusted under 35 U.S.C. 154(b) by 682 days.

(21) Appl. No.: 13/746,239

(22) Filed: Jan. 21, 2013

(65) Prior Publication Data

US 2014/0208084 A1 Jul. 24, 2014

(51) Int. Cl.
*G06F 9/30* (2006.01)

(52) U.S. Cl.
CPC .............. *G06F 9/30* (2013.01); *G06F 9/30145* (2013.01); *G06F 9/30167* (2013.01)

(58) Field of Classification Search
CPC ........ G06F 9/30; G06F 9/30007; G06F 9/345
See application file for complete search history.

(56) References Cited

U.S. PATENT DOCUMENTS

| | | | |
|---|---|---|---|
| 4,569,016 A | 2/1986 | Hao et al. | |
| 4,589,065 A | 5/1986 | Auslander et al. | |
| 4,589,087 A | 5/1986 | Auslander et al. | |
| 4,651,275 A * | 3/1987 | McDonough | G06F 9/3802 712/208 |
| 4,947,316 A | 8/1990 | Fisk et al. | |
| 5,307,492 A | 4/1994 | Benson | |
| 5,371,860 A | 12/1994 | Mura et al. | |
| 5,471,593 A | 11/1995 | Branigin | |
| 5,544,342 A | 8/1996 | Dean | |
| 5,625,838 A * | 4/1997 | Caudel | G06F 9/3001 712/32 |
| 6,076,158 A | 6/2000 | Sites et al. | |
| 6,167,509 A | 12/2000 | Sites et al. | |
| 6,212,629 B1 | 4/2001 | McFarland et al. | |
| 6,763,452 B1 | 7/2004 | Hohensee et al. | |
| 6,941,545 B1 | 9/2005 | Reese et al. | |
| 7,047,394 B1 | 5/2006 | Dyke et al. | |
| 7,401,333 B2 | 7/2008 | Vandeweerd | |
| 7,404,067 B2 | 7/2008 | Aamodt et al. | |
| 7,409,670 B1 | 8/2008 | Pritchard et al. | |
| 7,421,566 B2 | 9/2008 | Gschwind et al. | |
| 7,478,224 B2 | 1/2009 | Strom et al. | |
| 7,617,496 B2 | 11/2009 | Gonion | |
| 7,818,547 B2 | 10/2010 | Aamodt et al. | |
| 7,873,953 B1 | 1/2011 | Pritchard et al. | |
| 7,941,790 B2 | 5/2011 | Cabillic et al. | |
| 8,006,071 B2 | 8/2011 | Ball | |
| 8,065,502 B2 | 11/2011 | Gonion | |
| 8,065,504 B2 | 11/2011 | Yates et al. | |
| 8,127,121 B2 | 2/2012 | Yates et al. | |
| 8,161,444 B1 | 4/2012 | Pritchard | |
| 8,166,281 B2 | 4/2012 | Gschwind et al. | |
| 8,281,109 B2 | 10/2012 | Valentine et al. | |
| 2006/0200650 A1* | 9/2006 | Froemming | G06F 9/30098 712/220 |

* cited by examiner

*Primary Examiner* — William B Partridge
(74) *Attorney, Agent, or Firm* — Duft Bornsen Fettig, LLP

(57) ABSTRACT

A processor system includes a multichannel memory operable to store data values and a program memory operable to store Compound CISC (CCISC) instructions. The processor system also includes a processor operable to execute a computer program assembled with at least a portion of the compound CCISC instructions, to retrieve a CCISC instruction from the program memory, to access at least two data values in the multichannel memory based on the executed computer program, and to operate on the at least two data values in the multichannel memory based on the CCISC instruction. The processor retrieves the CCISC instruction, accesses the at least two data values, and operates on the at least two data values during a same clock cycle.

18 Claims, 37 Drawing Sheets

COMPOUND COMPLEX INSTRUCTION SET COMPUTER (CCISC) PROCESSOR ARCHITECTURE

CROSS REFERENCE TO RELATED APPLICATIONS

This patent application is related to commonly owned and co-pending U.S. patent application Ser. No. 13/746,249 (filed herewith and entitled "FLOWCHART COMPILER FOR A COMPOUND COMPLEX INSTRUCTION SET COMPUTER (CCISC) PROCESSOR ARCHITECTURE"), the entire contents of which are incorporated by reference.

FIELD OF THE INVENTION

The invention relates to computer architectures and more specifically to a processor for operating a compounded instruction set.

BACKGROUND

Computer architecture regards the basic structure of a computer from the standpoint of what exactly can be performed by code written for the computer. Ordinarily, architecture is defined by the number of registers in the Central Processing Unit (CPU), the logic operations performed by the Arithmetic and Logic Unit (ALU), etc. Usually, the architectural definition is expressed as an instruction set and its related elaboration. Some computer architectures have been founded on reduced instruction sets to provide performance advantages. Complex Instruction Set Computer (CISC) processors and Reduced Instruction Set Computing (RISC) processors are two examples of such.

RISC processors have an architecture based on simplified instructions capable of providing higher performance due to faster execution of each instruction. The general concept is that RISC processors use a small, highly-optimized set of instructions, rather than a more specialized set of instructions often found in other types of architectures. RISC processors use a load/store architecture that allows memory to be accessed by load and store operations with all values for an operation being loaded from memory and present in registers. After the operation, the result is stored back to memory.

CISC processors, on the other hand, are generally characterized as having a larger number of instructions in their instruction set, often including memory-to-memory instructions with complex memory accessing modes. The instructions are usually of variable length, with simple instructions being only perhaps one byte in length with complex instructions being in the dozens of bytes in length. The size of an operand specifier generally depends upon the addressing mode, etc. The first byte of the operand specifier describes the addressing mode for that operand, while the opcode defines the number of operands. When the opcode itself is decoded, the total length of the instruction is not yet known to the processor because the operand specifiers have not yet been decoded.

One advantage of CISC processors lies in the source code that generally result in more work being done by the processor for each line of code. But, this comes at the expense of execution time, more so when pipelining of instruction execution is necessary to achieve desired performance levels. The advantage of RISC processors, therefore, lies in the speed of execution of code, although less is accomplished by each line of code.

SUMMARY

Systems and method herein provide for compound instructions using compound data coupled from different data sources using different addressing modes. This Compound CISC, or "CCISC", overcomes the problems and tradeoffs associated with RISC and CISC processors by executing complex instructions, or opcodes, in a single clock cycle without incurring penalties for using any combination of advanced addressing modes. Generally, the CCISC assembly language is broken into four main types of opcodes which can be used to write programs that are executable within the CCISC processor. Decision opcodes compare two data values and conditionally branch to one branch target address while executing in a single clock cycle. The decision opcodes use a separate compare engine and do not employ an accumulator. Data manipulation, or "DMANIP", opcodes include arithmetic and logical operations that change data in some way. DMANIP opcodes can use one, two, or three data values, and can perform its operations directly from memory, again without employing an accumulator. By using two data values and one target address value, DMANIP opcodes can operate on two data values and store the results in a third location in a Random-access memory (RAM) bank. Data move, or "DMOV", opcodes can move data in the processor using two data values. The DMOV is comparable to a Direct Memory Access (DMA) in that the processor does not use an accumulator. Other predefined opcodes may be used to cover other instructions such as CALL, RETURN, NOP, SLEEP, SETC, CLRC, etc. Additionally, some predefined instructions may be fixed within certain address locations in memory so as to be address activated.

A processor system includes a multichannel memory operable to store data values and a program memory operable to store Compound CISC (CCISC) instructions. The processor system also includes a processor operable to execute a computer program assembled with at least a portion of the compound CCISC instructions, to retrieve a CCISC instruction from the program memory, to access at least two data values in the multichannel memory based on the executed computer program, and to operate on the at least two data values in the multichannel memory based on the CCISC instruction. The processor retrieves the CCISC instruction, accesses the at least two data values, and operates on the at least two data values during a same clock cycle.

In one embodiment, the processor, in operating on the at least two data values, is operable to compare the at least two data values to branch to an address in the multichannel memory, to change at least one of the data values in the multichannel memory, and/or to move at least one data value from a first address to a second address in the multichannel memory based on the CCISC instruction. The processor may be configured in a variety ways but in one embodiment is an 8-bit processor. The processor system may also include an address generation unit operable to generate addresses to access the at least two data values in the multichannel memory.

The various embodiments disclosed herein may be implemented in a variety of ways as a matter of design choice. For example, the embodiments may take the form of computer hardware, software, firmware, or combinations thereof. In one embodiment, a method is operable within the processor system to perform the functionality described herein. In another embodiment, a computer readable medium is operable to store software instructions that are operable to implement the various steps of the method. For example, the executable program may be stored on a computer readable medium so as to direct the processor to retrieve the opcodes from the program memory and operate in the manner described above. Other exemplary embodiments may be described below.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
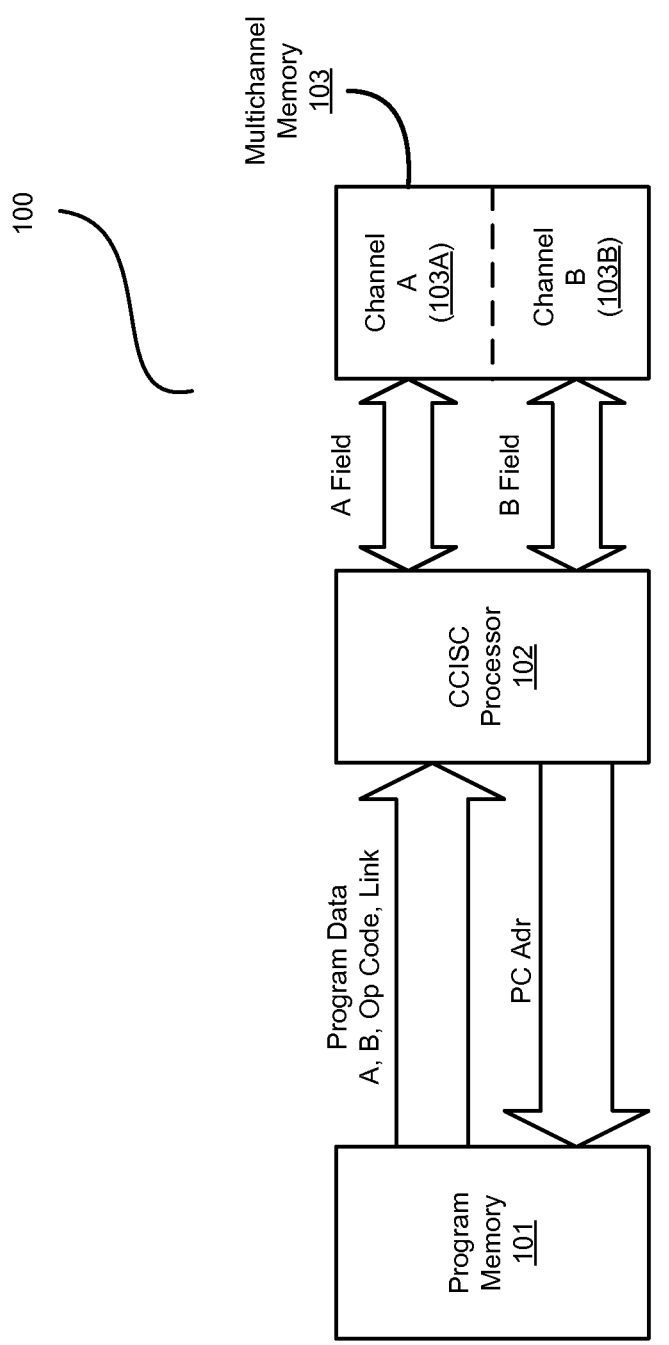
FIG. 1 is a block diagram of an exemplary of a CCISC processor system.

FIG. 1 is a block diagram of an exemplary CCISC processor system 100. The CCISC processor system 100 includes a program memory 101, a processor 102, and a multichannel memory 103. The program memory 101 is any type of memory or storage module that is operable to store and maintain CCISC instructions, or "opcodes". The opcodes are used by the processor 102 to operate on data values in the multichannel memory 103. The multichannel memory 103 is any type of memory or storage module operable to store and maintain data values. The processor is any microprocessor or controller operable to process the opcodes and make decisions, manipulate data, and/or move data, based on the data values in the multichannel memory 103 and the opcodes.

Figure 2:
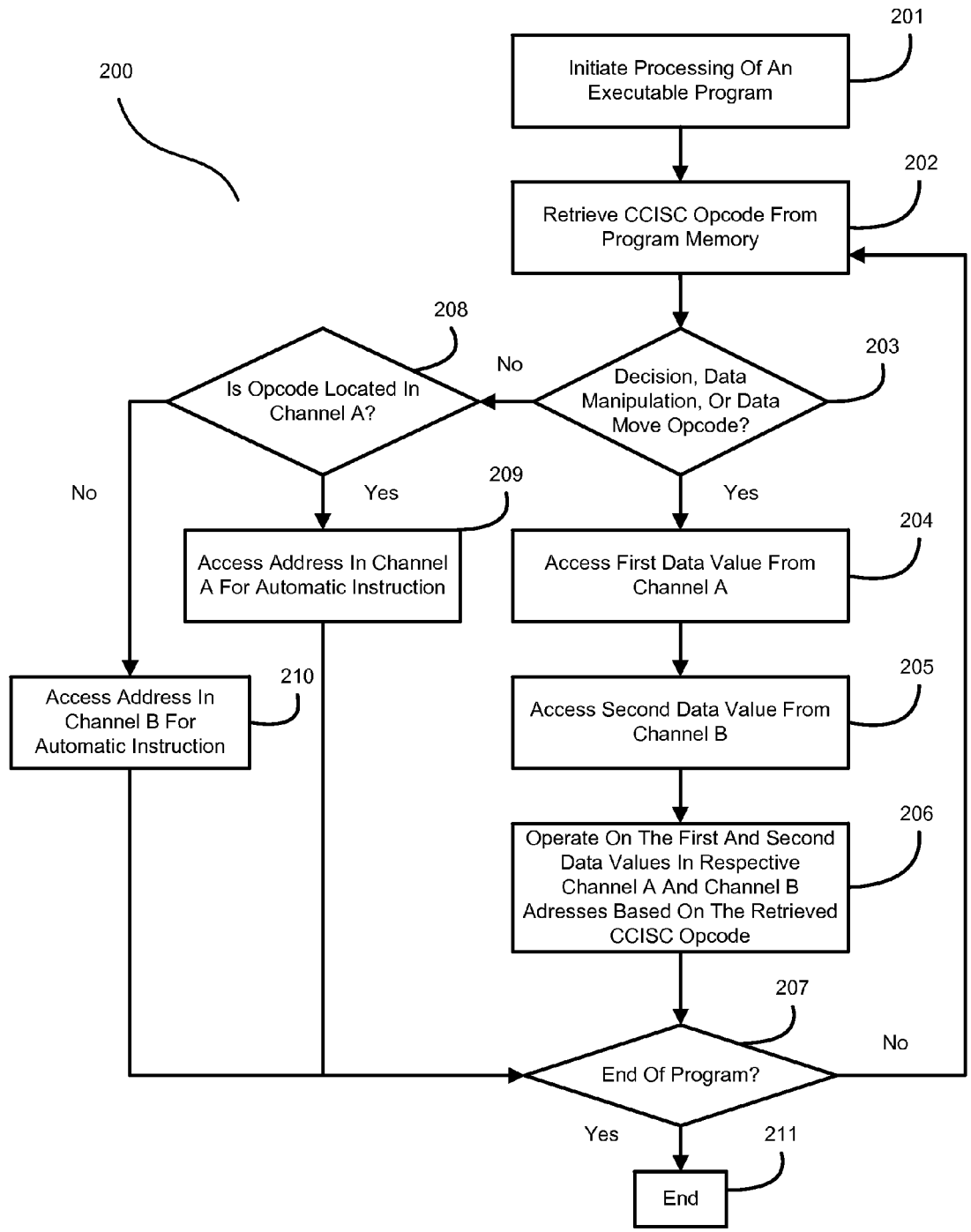
FIG. 2 is a flowchart of an exemplary method operable with the CCISC processor system of FIG. 1.

Discussion of the CCISC processor system 100 is now directed to the exemplary flowchart 200 illustrated in FIG. 2. In FIG. 2, the process that is operable with the CCISC processor system 100 initiates when the CCISC processor 102 is directed by an executable program, in the process element 201. For example, when a computer program is assembled and compiled for operation with a particular processor, the computer program is then stored on a computer readable medium. The processor then accesses the computer readable medium to retrieve the instructions thereof, thereby initiating execution of the computer program. In this embodiment, the CCISC processor system 100 retrieves a CCISC opcode from the program memory 101 based on the instruction of the executable program, in the process element 202. The CCISC processor 102 then determines the type of opcode in the process element 203. As discussed above, the opcodes may be decision opcodes, DMANIP opcodes, or DMOV opcodes that are maintained within the program memory 101. The term opcode as used herein may also include certain predefined instructions such as CALL, RETURN, NOP, SLEEP, SETC, CLRC, etc. Other opcodes may be fixed within certain address locations in memory so as to be address activated. Various exemplary opcodes are described below in greater detail.

If the CCISC processor 102 determines that the opcode is a decision opcode, DMANIP opcode, or a DMOV opcode, and the CCISC processor 102 accesses a first data value from channel A of the multichannel memory 103, in the process element 204, and a second data value from channel B of the multichannel memory 103, in the process element 205. The CCISC processor 102 then operates on the first and second data values in their respective locations of the multichannel memory 103 based on the retrieve CCISC opcode, in the process element 206. That is, the CCISC processor 102 does not utilize an accumulator or other register to store the data values from the multichannel memory 103 such that the data values may be operated on and then returned to the multichannel memory 103. Rather, the CCISC processor 102 operates on the data values directly within the multichannel memory 103. Thus, if the opcode is a decision opcode, the CCISC processor 102 may compare the data values within the multichannel memory 103 to branch to another target address within the program memory 101, which indirectly addresses within the multichannel memory 103. If the opcode is a DMANIP opcode, then the CCISC processor 102 may perform an arithmetic or logical operation that changes one or more of the data values in channels A and B of the multichannel memory 103. If the opcode is a DMOV opcode, then the CCISC processor 102 may move a data value from channel A to channel B, or vice versa.

After operating on the data values, in the process element 206, the CCISC processor 102 determines whether the end of the program has been reached, in the process element 207. If not, the CCISC processor 102 returns to the process element 202 to retrieve the next opcode. Otherwise, the program ends in the process element 211.

If the CCISC processor 102 determines that the opcode is not a decision opcode, a DMANIP opcode, or a DMOV opcode in the process element 203, the CCISC processor 102 then determines whether the opcode is located in channel A of the multichannel memory 103, in the process element 208. If the opcode is located in channel A of the multichannel memory 103, then the CCISC processor 102 accesses the address where the instruction is located in channel A for automatic instruction or direction, in the process element 209. Depending on an address read from the A Field of the opcode, the CCISC processor 102 addresses Channel A of the multichannel memory 103. If the address falls in a specific range of addresses, it causes automatic instructions to initiate, in addition to the Decision, DMOV, DMANIP operations implemented by their respective opcodes.

For example, the CCISC processor 102 may process the opcode, in the process element 208, and determine that the opcode is actually a particular address in channel A of the multichannel memory 103. From there, the CCISC processor 102 may access that address in channel A of the multichannel memory 103 where a predefined instruction is located. The address itself causes the automatic instruction to operate with no further fetch of an opcode being necessary. Examples of such predefined/automatic instruction include pointer increments, status checks, etc. Thus, the opcode may be "address actuated" and that the CCISC processor 102 is automatically directed to the address location in the channel A of the multichannel memory 103 for automatic instruction. If the CCISC processor 102 determines that the opcode is not located in channel A of the multichannel memory 103, then the CCISC processor 102 accesses an address in channel B where the instruction is located for similar automatic instruction or direction, in the process element 210. In either case, after the address actuated instruction of the process elements 209 and 210 is executed, the CCISC processor 102 determines whether the program is at its end, in the process element 207, again returning to process element 202 if it is not and progressing to process element 211 if so.

To summarize, the decision, DMOVE, DMANIP, and predefined opcodes read the A and B data sources. Depending on the automatic instruction to determine where the data is located, the opcodes provide additional operations, such as pointer manipulation. And, there are two sets of "address actuated" circuits that provide automatic instructions for both the A and B data sources.

Figure 3:
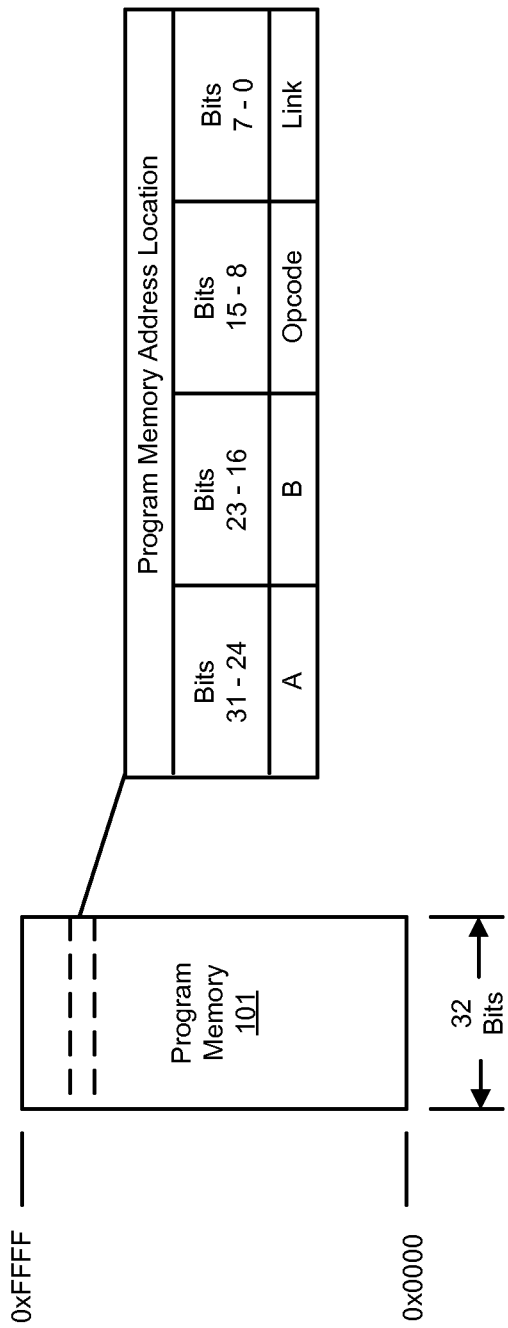
FIG. 3 illustrates an exemplary embodiment of program memory operable with the CCISC processor of FIG. 1.

FIG. 3 illustrates an exemplary embodiment of the program memory 101 operable with the CCISC processor 102. In this embodiment, the program memory 101 is a 32-bit wide memory having addresses of 0x0000 through 0xFFFF (i.e., 65,536 addresses). Each 32-bit word in the program memory 101 is subdivided into four 8-bit fields, comprising the A field (bits 31-24), the B field (bits 23-16), the opcode field (bits 15-8) and the link field (bits 7-0). The A field provides the data or address of channel A in the multichannel memory 103 during an instruction fetch for the current CCISC instruction of the executable program being processed by the CCISC processor 102. The B field similarly provides the data or address of channel B in the multichannel memory 103 during the instruction fetch. The opcode field provides the operation code during the instruction fetch. The link field provides address data during the instruction fetch as well as target addresses within the multichannel memory 103 for a DMA-NIP opcode or a decision opcode. The link field may also be used for various predefined opcodes that are address actuated in the multi-channel memory 103.

Figure 4:
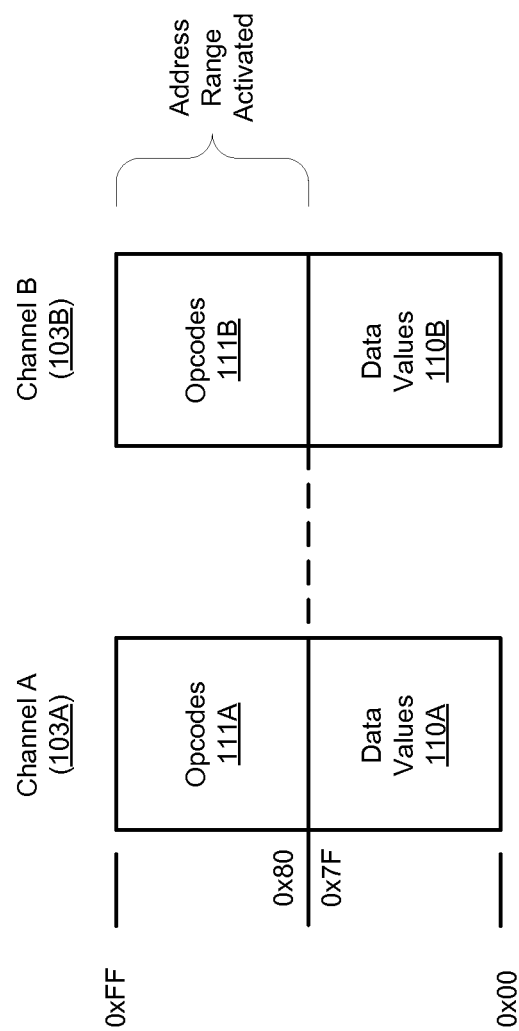
FIG. 4 illustrates an exemplary multichannel memory operable with the CCISC processor of FIG. 1.

FIG. 4 illustrates the multichannel memory 103 operable with the CCISC processor 102. For the purposes of illustration, the multichannel memory 103 is illustrated as two separate channels 103A and 103B representing the channels A and B described above. In this embodiment, channels A 103A and B 103B have address ranges from 0x00 to 0xFF (i.e., 256 addresses). Each channel 103A and 103B is designated with two sections, data values 110 for addresses 0x7F and below, and address range activated opcodes for addresses 0x80 and above. The data values 110A and 110B may be used to store any data values required by the executable program, much like any other processing system. One difference between prior art processing systems and the present processing system is that the CCISC processor 102 operates on the data values directly within the channels 103A and 103B of the multichannel memory 103. In the opcode sections 111A and 111B, the channels 103A and 103B store their respective predefined opcodes. An example of such is illustrated in FIG. 5.

Figure 5:
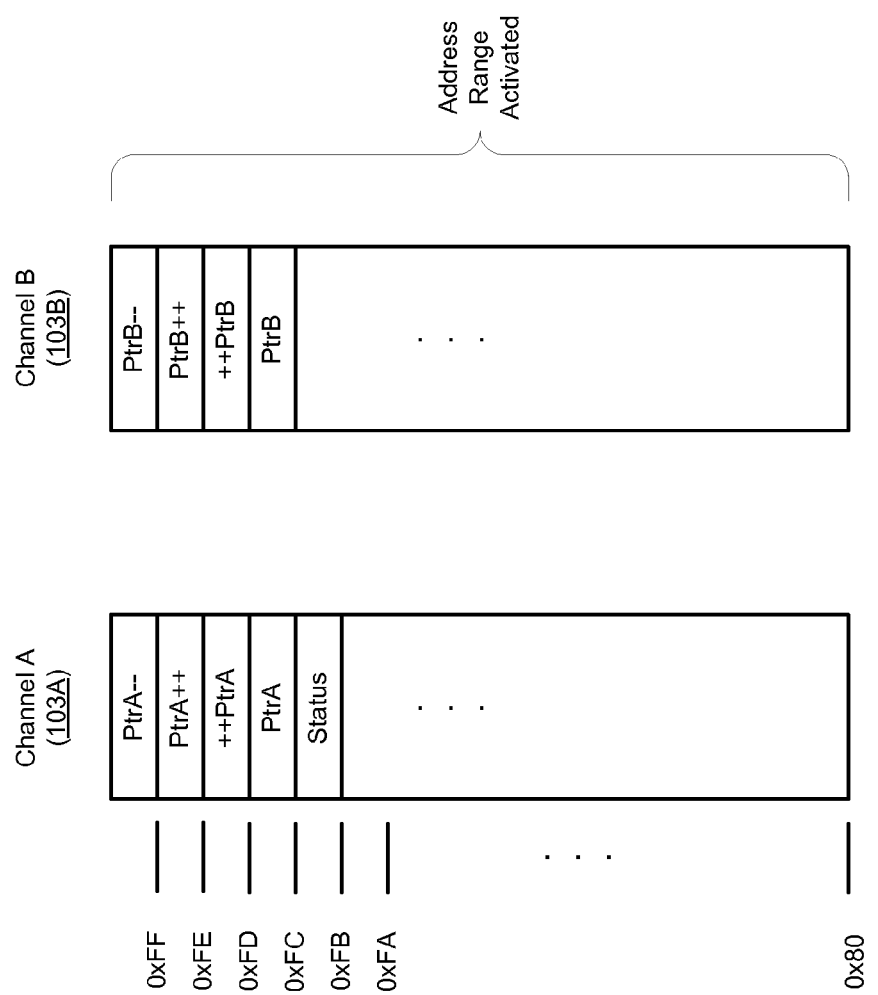
FIG. 5 illustrates exemplary predefined instructions within the multichannel memory that are address range activated.

FIG. 5 illustrates exemplary predefined instructions within the multichannel memory 103 that are address range activated. For example, when the CCISC processor 102 is directed to access address 0xFF in channel 103A of the multichannel memory 103, the CCISC processor 102 is automatically directed to perform a pointer decrement (PtrA--) within the channel 103A. Similarly, when the CCISC processor 102 is directed to access address 0XFF in channel 103B of the multichannel memory 103, the CCISC processor 102 is automatically directed to perform a pointer decrement (PtrB--) within the channel 103B. Other examples of predefined opcodes include STATUS, CALL, RETURN, NOP, SLEEP, SETC, CLRC, pointer increments, such as PtrA++ and ++Ptr, and indirect address accesses through pointers (e.g., PtrA and PtrB). Of course, the invention is not intended to be limited to any particular address allocation or type of opcode being configured within the channels 103A and 103B of the multichannel memory 103.

Figure 6:
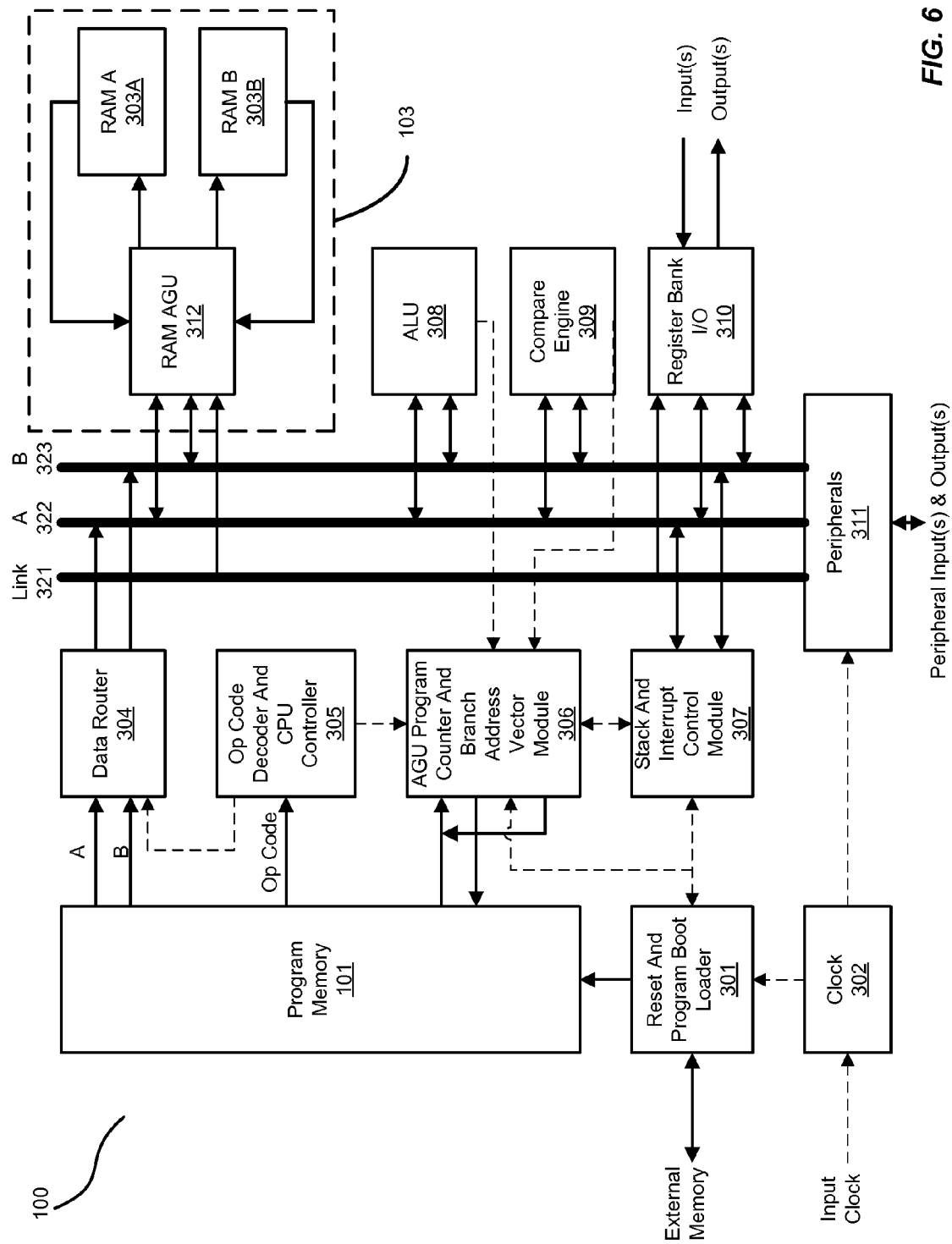
FIG. 6 is a block diagram of another exemplary embodiment of the CCISC processor system.

FIG. 6 is a block diagram of another exemplary embodiment of the CCISC processor system 100. The processor system 100 includes the program memory 101 of FIG. 1 as well as the multichannel memory 103 configured as a dual channel RAM bank adding channels 303A and 303B and a RAM Address Generation Unit (RAM AGU) 312. The CCISC processor 102 is configured from the reset and program boot loader 301 (boot loader 301), a clock 302, a data router 304, an opcode decoder and CPU controller 305, an AGU program counter and branch address vector module 306 (AGU), a stack and interrupt control module 307, an algorithmic logic unit (ALU) 308, a compare engine 309, and a register bank input/output (I/O) 310. The CCISC processor 102 may be optionally coupled to peripherals 311, such as other devices or computing modules.

Figure 7:
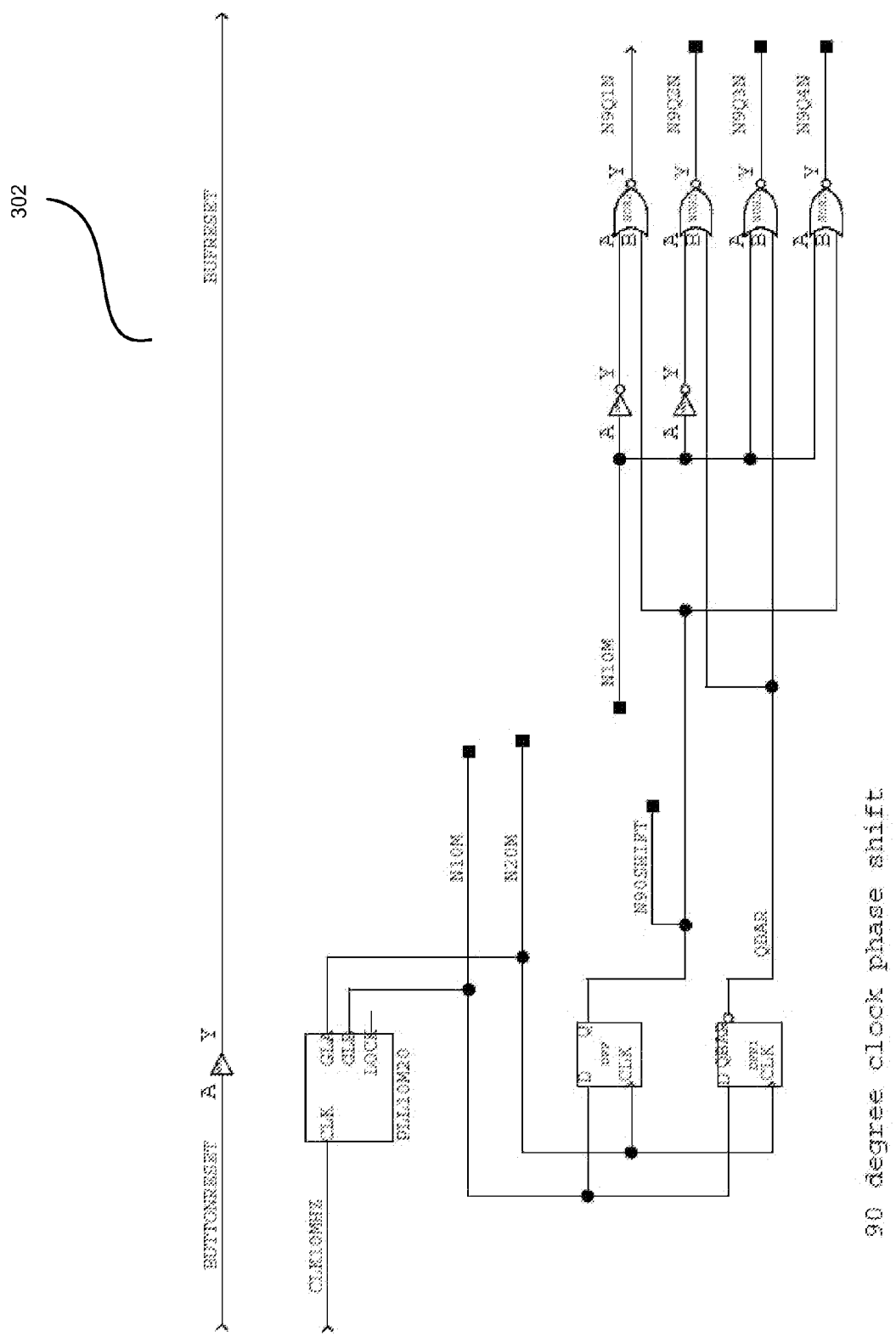
FIGS. 7-36 illustrate various exemplary logic diagrams used to implement components of the CCISC processor system of FIG. 6.

The clock 302 provides timing control and uses an input clock and an input clock shifted by 90 to create four quadrature clocks without clock multiplying. The lower speed input clocks save power and creates quadrature clocks Q1, Q2, Q3, Q4, as illustrated in FIG. 7 with references numbers N9Q1N-N9Q4N.

The boot loader 301 is coupled to the program memory 101 to initiate operations of the CCISC processor 102. The boot loader 301 controls the reset of the CCISC processor 102 and each of its control registers. A "RESET" opcode provides "power-up and time-out counters" that hold the CCSIC processor 102 in reset while a power supply (not shown) stabilizes. The RESET clears internal processor control registers and sets default power-up conditions. In addition to being coupled to the program memory 101, the boot loader 301 may be coupled to external memory, such as a serial Electrically Erasable Programmable Read-Only Memory (EEPROM), through a serial peripheral interface (SPI) to boot the CCISC processor 102, although the processor system 100 may be configured with internal non-volatile memory.

Once the boot loader 301 is initialized and activated, the boot loader 301 may reset the program counter of the AGU 306 to 0x0000. The boot loader 301 then reads the external memory and writes the data into the program memory 101. The boot loader 301 loads the program memory 101 with executable code and then passes control to the AGU 306 which starts at the address 0x0000.

Figure 8:
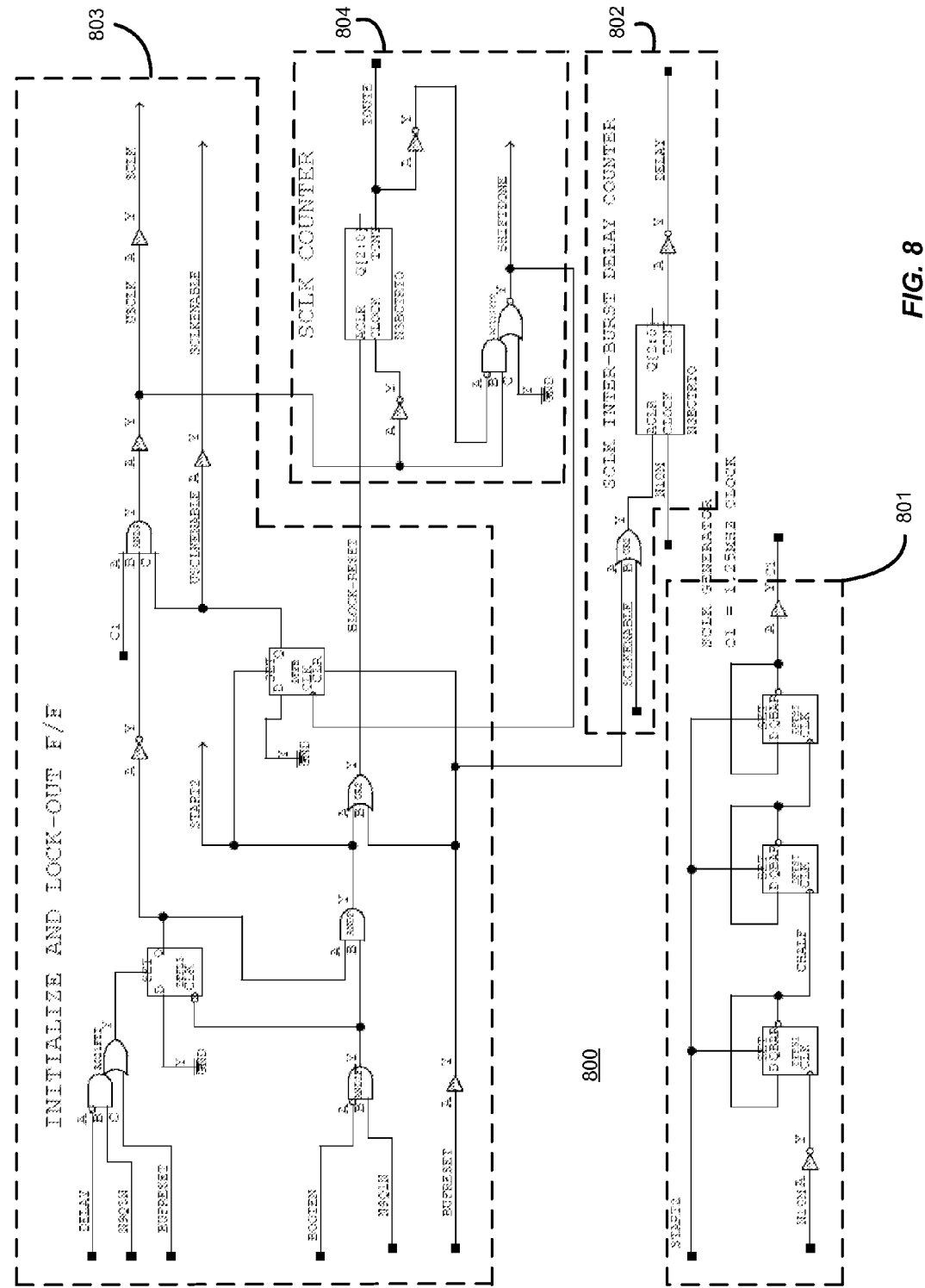
Figure 9:
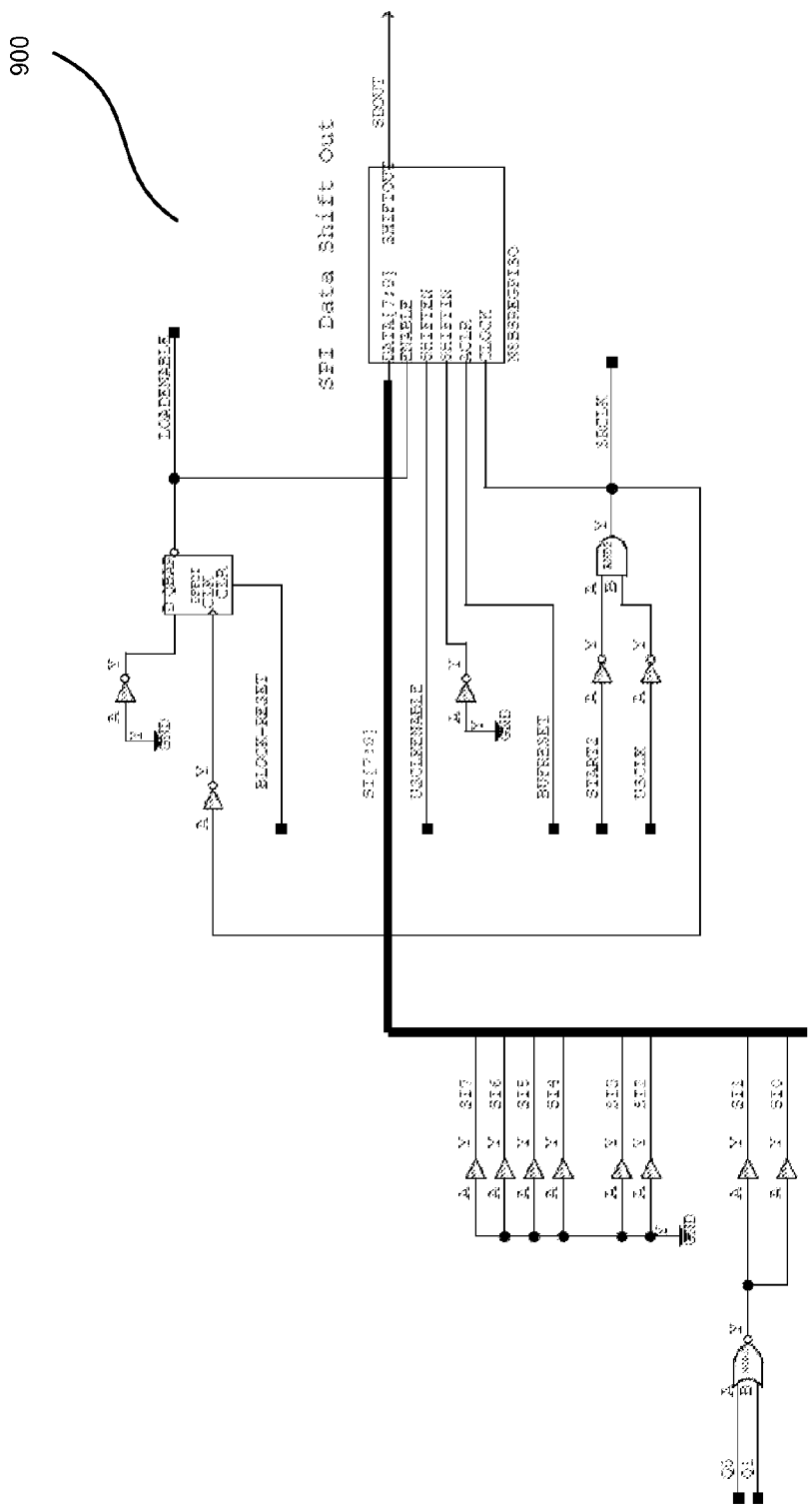
Figure 10:
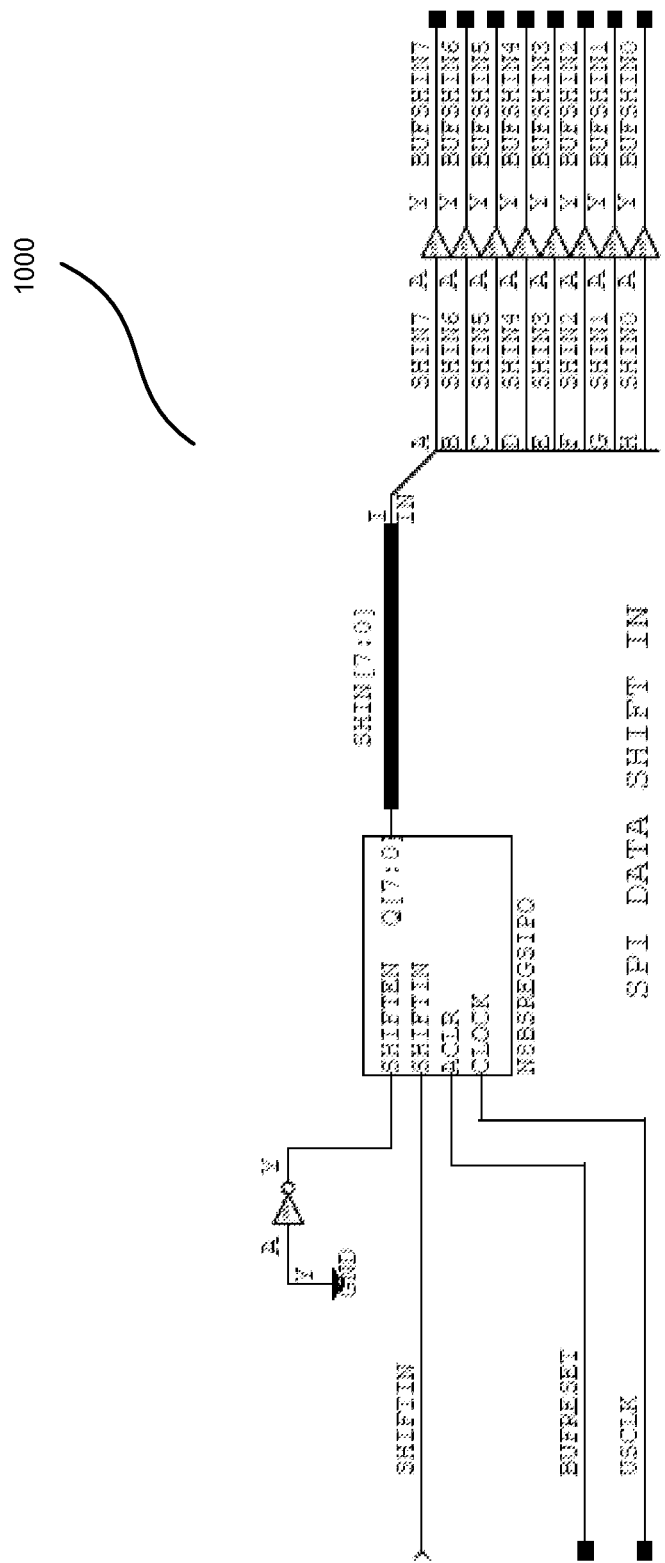
Figure 11:
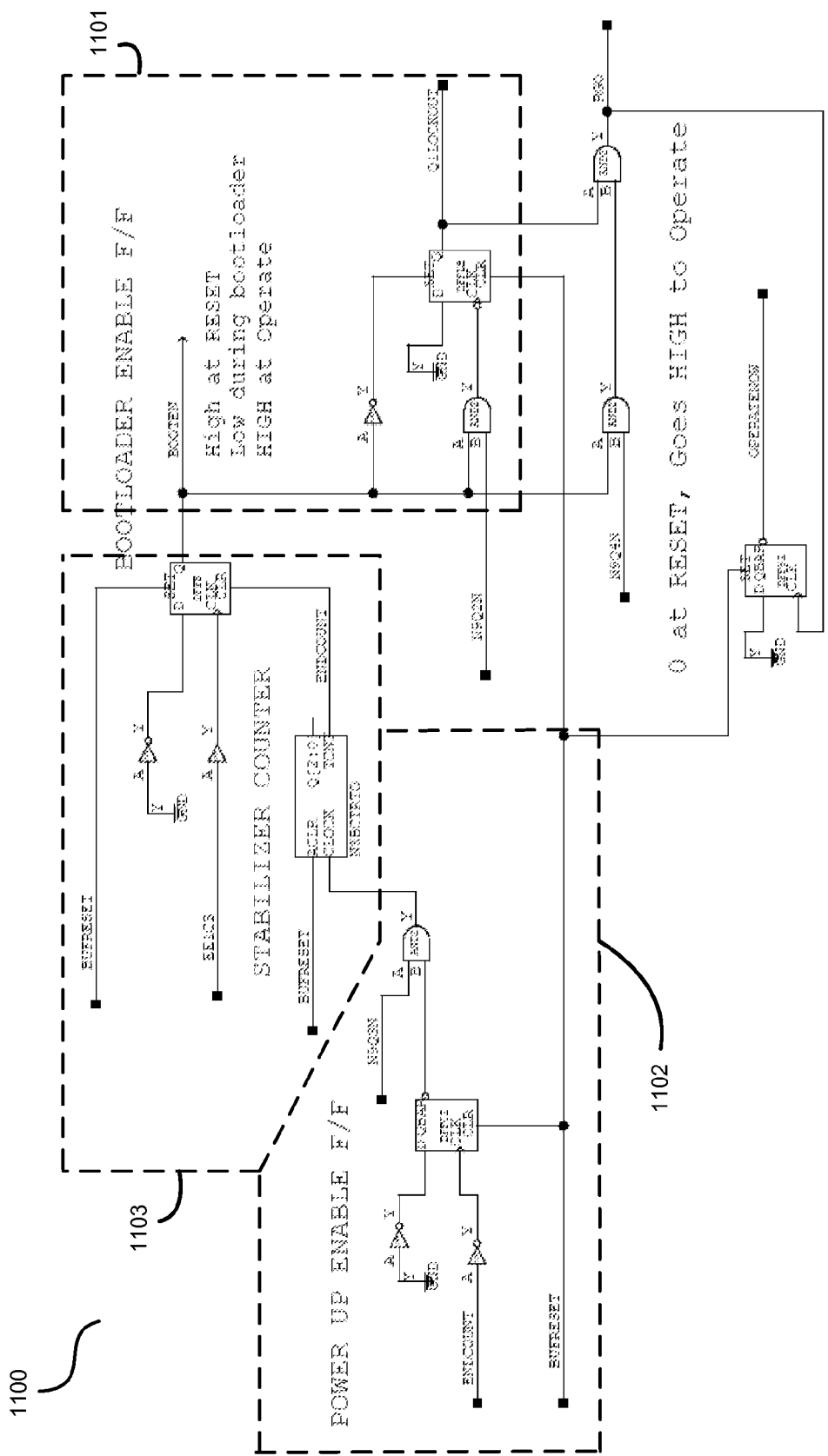
Figure 12:
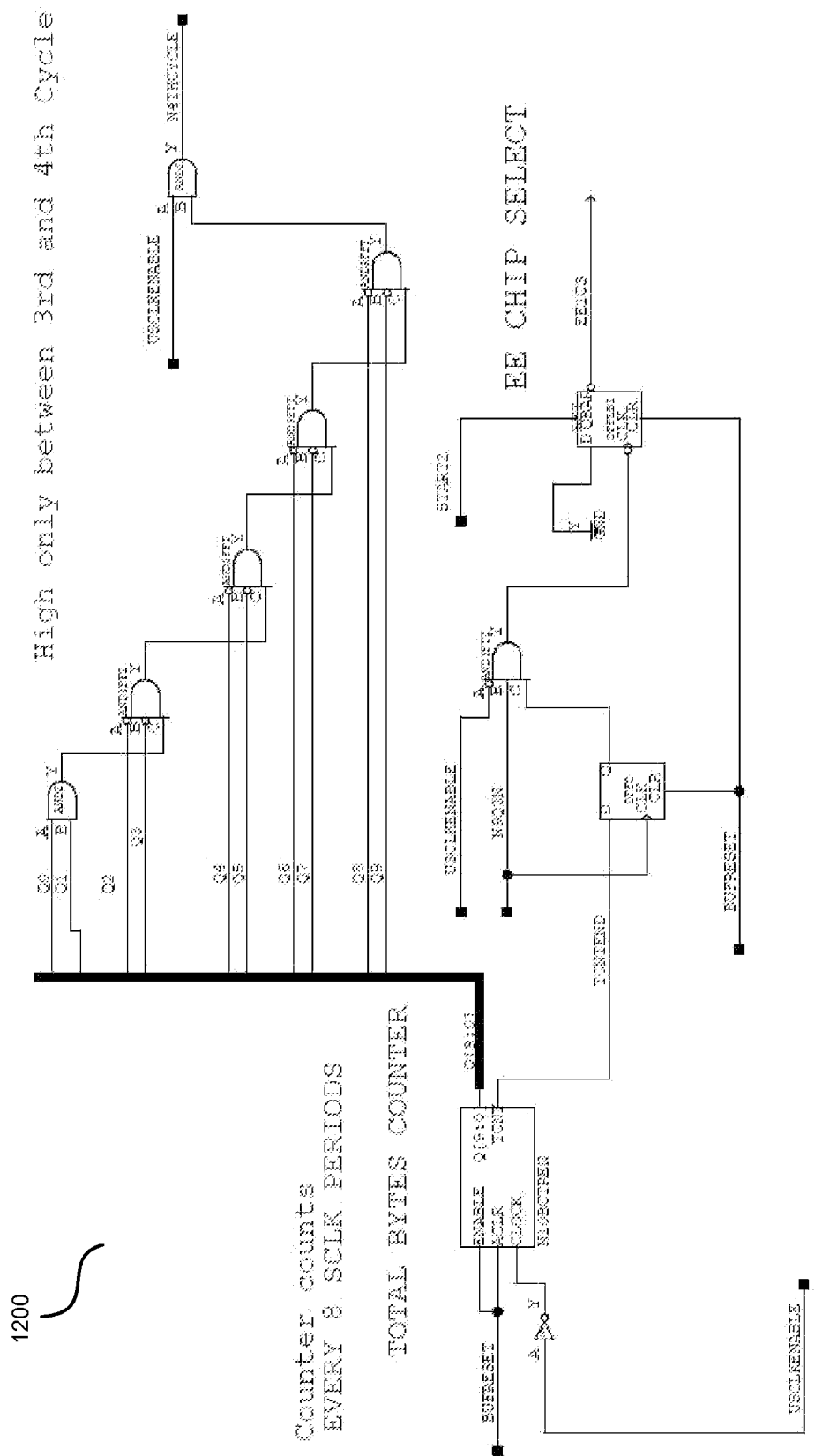

The boot loader 301 may be configured with a variety of modules, such as a shift register generator/control 800 illustrated in FIG. 8, an output shift register 900 illustrated in FIG. 9, an input shift register 1000 illustrated in FIG. 10, and a boot loader control 1100 illustrated in FIG. 11. The shift register generator/control 800 interfaces to the program memory 101 and includes a clock generator 801 that provides the clock for the SPI interface. A clock inter-burst delay counter 802 provides for a delay between bursts of SPI clocks. The initialize and lockout feed forward module 803 establishes the SPI state machine for reading the external memory contents before passing control to the CCISC processor 102. The clock counter 804, in general, counts every 4 external data bytes for writing into the program memory 101. The output and input shift registers of and state machines to communicate with a SPI interface. The output shift register 900 of FIG. 9 uses a SPI "Data Shift Out" to output data from the external memory for serial communications, but is generally not needed when booting is performed from the program memory 101.

The boot loader control 1100 enables the start state of the boot loader 301 from RESET and detects the end state. A boot loader enable module 1101 enables the state of the boot loader 301 and disables the state of the boot loader 301 when passing control to the AGU 306 and CCISC processor 102 in general. Also, at the beginning of the state of the boot loader 301, all instruction execution is generally locked out. A power up enable module 1102 is activated by the external RESET signal and provides a power up and reset of the loader 301 and the CCISC processor 102 in general. A stabilizer counter 1103 provides delay for voltage stabilization purposes at RESET.

A state machine counter 1200 counts the number of bytes loaded from the external memory and signals when to stop downloading (i.e., TOTAL BYTES COUNTER). The end of the download state is also provided by the RESET. The "EE CHIP SELECT" drives the selection from external memory and the program memory 101. A logical high between third and fourth clock cycles enables a continuous read operation from the external memory.

Figure 13:
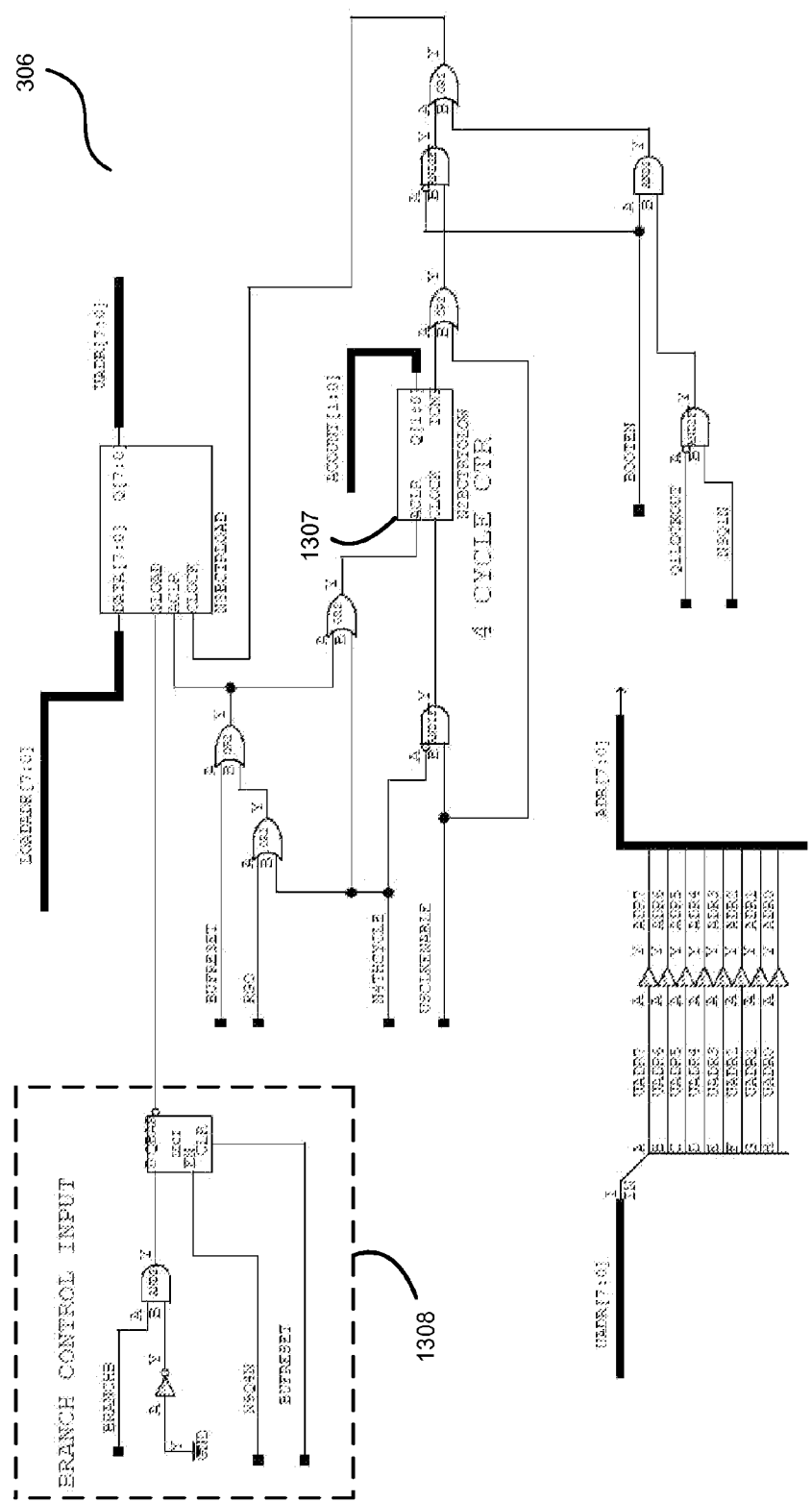

The AGU 306 addresses the program memory 101 for fetching the CCISC opcodes to execute. One example of the AGU 306 is illustrated in FIG. 13. The program counter 1307 generates addresses for the program memory 101 and can be altered by a branch type of instruction (e.g., branch addresses, CALL and RETURN subroutines, absolute addressing, and ±relative branch addressing) or by address vector (e.g., interrupt vector addressing). In one embodiment, the program counter 1307 address of the AGU 306 is 16 bits wide, having 64K address range, starting at 0x0000 after RESET, and generally counting up from there. A branch control input module 1308 is used for loading branch addresses into the AGU 306. A "4-cycle" control module supports the boot loader 301 to write data from the external memory to be program memory 101 on a byte to byte basis.

Figure 14:
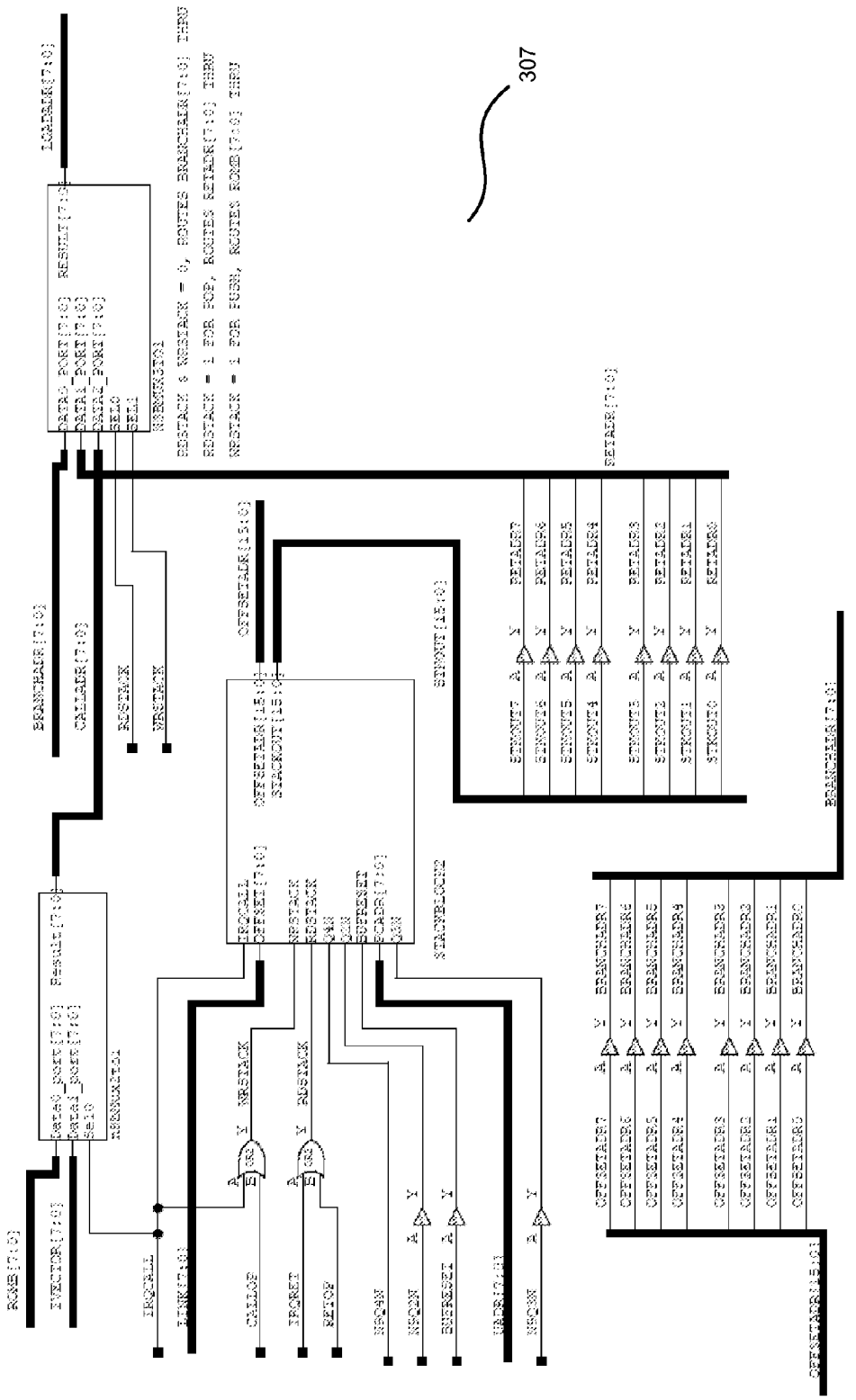

The stack and interrupt control module 307 is coupled to the AGU 306 to provide an address stack for storing return addresses during function calls or address vector events, such as interrupts. The stack and interrupt control module 307 includes the address stack and muxes for use with the AGU 306 and the program counter 1307 thereof. In one embodiment, the stack is a 128×16 address stack with 128 16-bit entries having a self-contained stack control and a return address with a plus or minus 7 bit offset. An example of the stack and interrupt control module 307 is illustrated in FIG. 14, including interrupt control block for containing the interrupt enable/disable control, an interrupt edge synchronizer, and an interrupt vector address. The stack and interrupt control module 307 activates the interrupt and loads the interrupt address vector into the AGU 306 upon receiving an interrupt request. Upon executing a RETURN from interrupt, the return address is loaded from the stack and the interrupt is turned off. For example, the subroutine RETURN may restore a return address plus 1 or some other offset value from the address stack.

The stack and interrupt control module 307 also includes an interrupt state machine that senses and synchronizes interrupt signals restores ACC (i.e., Accumulator) and STATUS. Data upon an existing interrupt mode, and is relatively fast with 1½ to 2½ clock interrupt latency. Additionally, the stack and interrupt control module 307 controls RAM A 303A and RAM B 303B for automatic saving ACC and STATUS data during interrupts. An example of such as illustrated in FIG. 14. The stack and interrupt control module 307 also supports the subroutine CALL while saving the return address on the stack.

Figure 15:
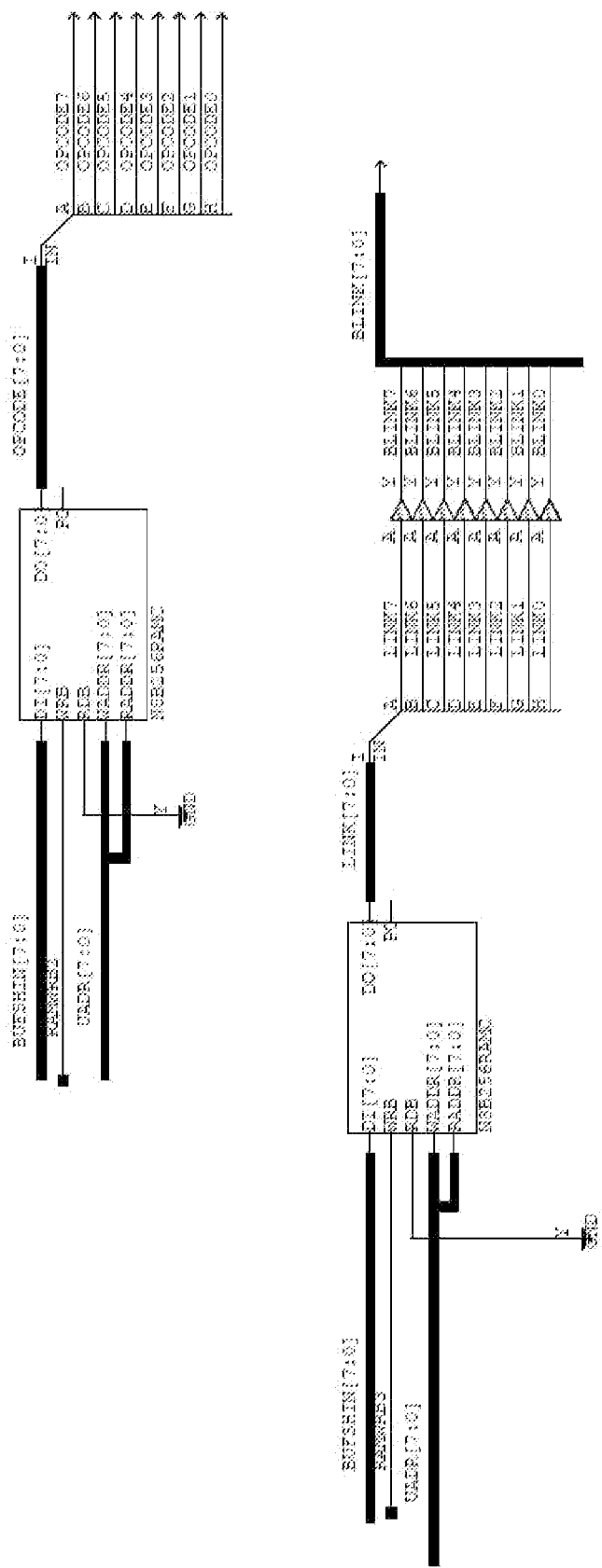

As mentioned, the program memory 101 may be 32 bits wide to accommodate 32 bit CCISC opcodes. To provide the opcodes to the processor 102, the program memory 101 may be configured with an opcode ROM and link ROM with write data for these ROMs coming from the boot loader 301 and the input shift register 1000 thereof. An example of such is illustrated in FIG. 15. To decode the opcodes, the CCISC processor 102 employs the opcode decoder and CPU controller 305. The decoder/CPU controller 305 block reads opcode fields from the program memory 101 to decode current CCISC instructions. Decoder/CPU controller 305 also controls basic data routing for the A and B data fields of the CCISC instructions (i.e., for the RAMs 303A and 303B).

Figure 16:
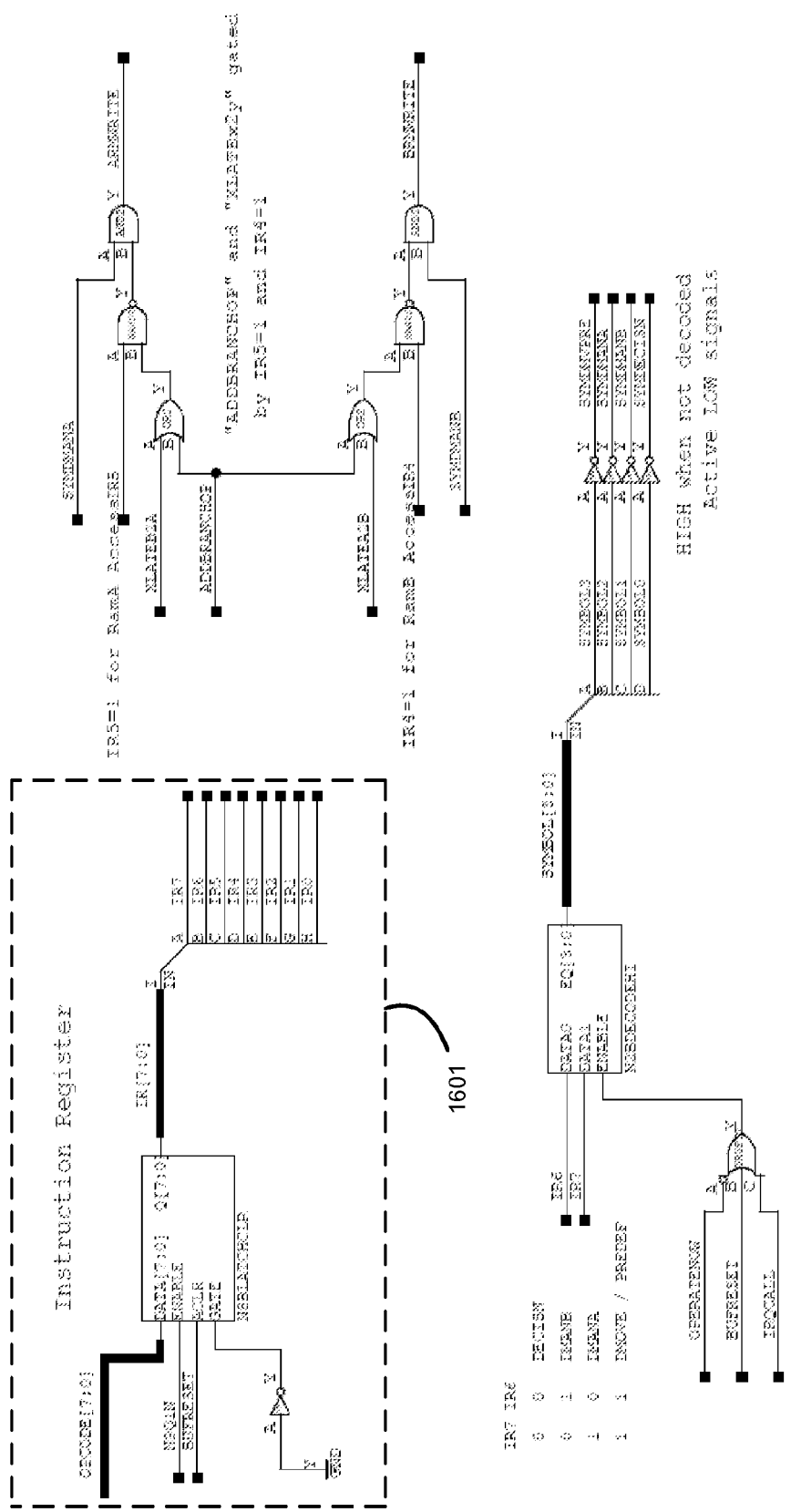
Figure 17:
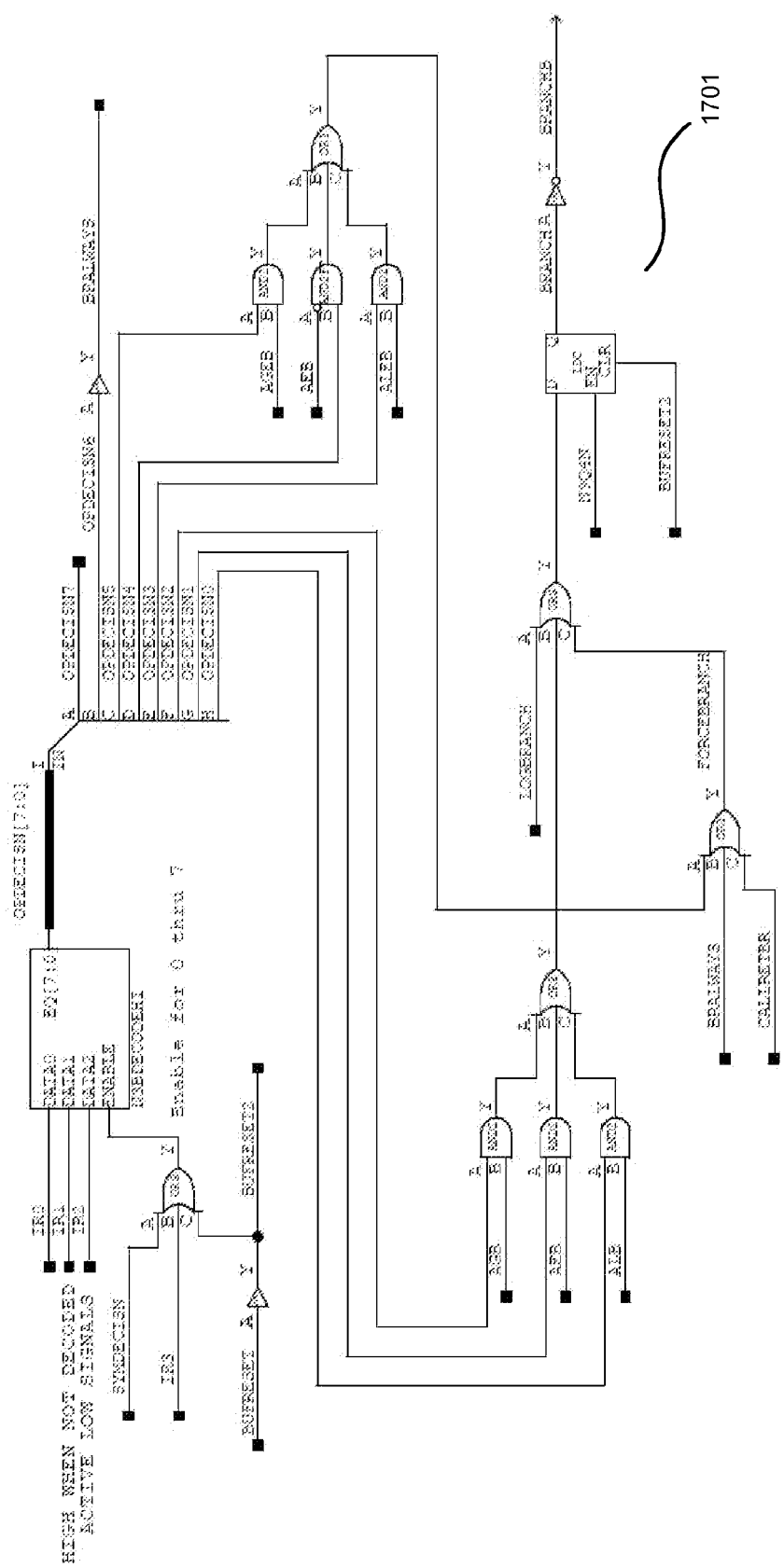

FIG. 16 illustrates an instruction register which holds a current opcode. The decoder/CPU controller 305 is the module of the CCISC processor 102 that decodes the four types of CCISC instructions (i.e., decision opcodes, DMANIP opcodes, DMOV opcodes, and the predefined opcodes such as CALL, RETURN, NOP, SLEEP, SETC, CLRC, etc.). The decoder/CPU controller 305 can enable and disable all CCISC instructions within the CCISC processor 102. FIG. 17 illustrates a decision instruction decoder module 1701 of the decoder/CPU controller 305. The decision instruction decoder module provides decisions for <, =, >, <=, !=, and >= comparison operations. The decision instruction decoder module 1701 also decodes "branch always" decision opcodes and provides for branch enable flip-flop.

Figure 18:
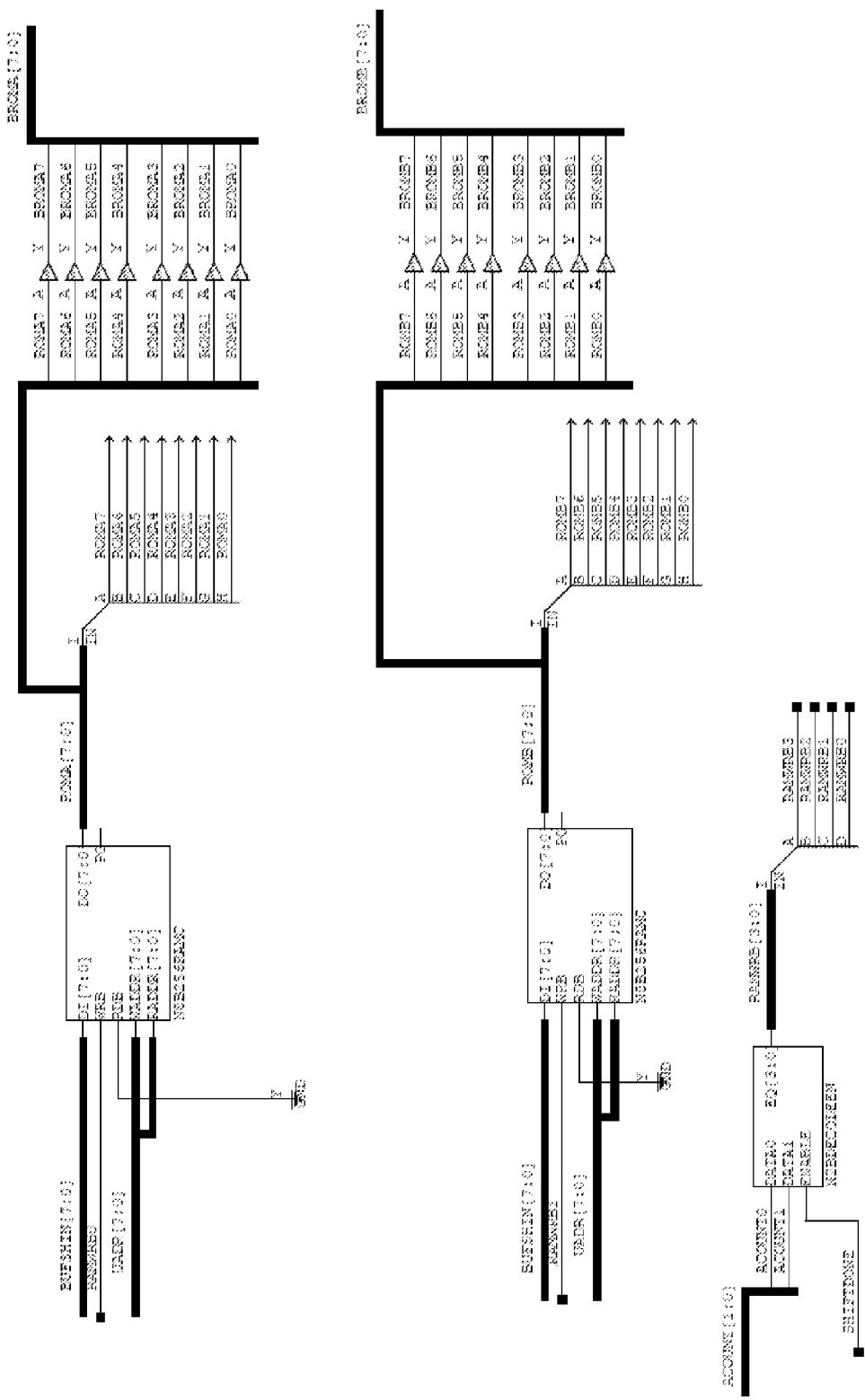

The data router 304 provides multiple data sources for the A and B data fields of the CCISC instructions. Internal A and B data buses may each be driven by a 4-input, 8-bit data mux to provide four data sources for the A and B data fields for each of the CCISC instructions. The data router 304 combines data routing with advanced addressing modes to provide the CCISC processor 102 with many data source possibilities for each of the A and B data fields. The data router 304 multiplexes data sources for the A and B data fields (e.g., ROM A and RAM A of the program memory 101 for the A data field and ROM B, RAM B, and system buffer other program memory 101 for the B data field. Data muxes of the data router 304 provide for direct memory access to the RAMs 303A and 303B and may even swap data between the RAMs 303A and 303B. Write data for these data fields may be delivered by the loader 301 and the input shift register 1000 thereof. An example of the multiplexing by the data router 304 is illustrated in FIG. 18.

The link bus 321, A bus 322, and the B bus 323 are internal 8-bit address buses coupling RAMs 303A 303B with various modules of the CCISC processor 102. It should be noted that this is a significant difference from other processors particularly 8-bit processors. More specifically, the A bus 322 is coupled to the RAM 303A and the B bus 323 is coupled to the RAM 303B such that the RAMs 303A and 303B provide a dual scratchpad for the CCISC processor 102. The output from the data router 304 drives the A bus 322 and the B bus 323 to support internal compound data. The link field of the link bus 321 is driven from the program memory 101 to provide single cycle writes and branches. The link bus 321 can also be used for addressing offset accesses.

The RAM AGU 312 provides complex addressing and intelligent memory functions. The RAM AGU 312 provides independent and simultaneous use of two different addressing modes for each CCISC construction. For example, the RAM AGU 312 may be configured to independently access each of the RAMs 303A and 303B. The RAM AGU 312 also provides indirect pointer and pre/post use pointer manipulation as discussed above. In one embodiment, pointer registers are implemented with up-and-down counters, but can be implemented using an adder for different increment/decrement offsets. The independent pointer manipulation by the RAM AGU 312 reduces clock cycles for the CCISC processor 102. Predefined pointers within the RAMs 303A and 303B also offload execution from the CCISC processor 102 by pushing such processing onto the RAM AGU 312. As mentioned above, the RAMs 303A and 303B may be configured with 256 8-bit locations with the lower 128 locations being directly addressable and the upper 128 locations being indirectly addressable. However, the memory can be extended and/or the locations may be configured as a matter of design choice.

The ALU 308 supports DMANIP CCISC instructions of the CCISC processor 102. The ALU 308 provides functionality such as add, subtract, shift/rotate left, shift/rotate right, logical AND, logical OR, and logical XOR as well as carry and zero flags. Bit testing decision instructions use the ALU to perform a logical AND with the contents of a data field and the bit mask to test for one or more bits being set or cleared.

The ALU 308 is operable to test for several bits at once in a single clock cycle. For example, if the results of an AND is equal to 0, then all of the bits are cleared. If the results of the AND is not equal to 0, then at least one bit is set. The ALU 308 also uses auto count and test decision instructions to perform an ADD with the contents of a data field and 0x01 or 0xFF (negative 1) to support auto-count modes and checking for counter expiration. For example, if the result of an increment/decrement is equal to 0, then the count is rolled over to 0. If, however, the result of an increment/decrement is not equal to 0, then the count is not rolled over to 0. Outputs of the ALU 308 are routed back to the A and B field data muxes describes above. This makes the results of ALU 308 functions available to either the A or B fields for use in CCISC instructions.

Figure 19:
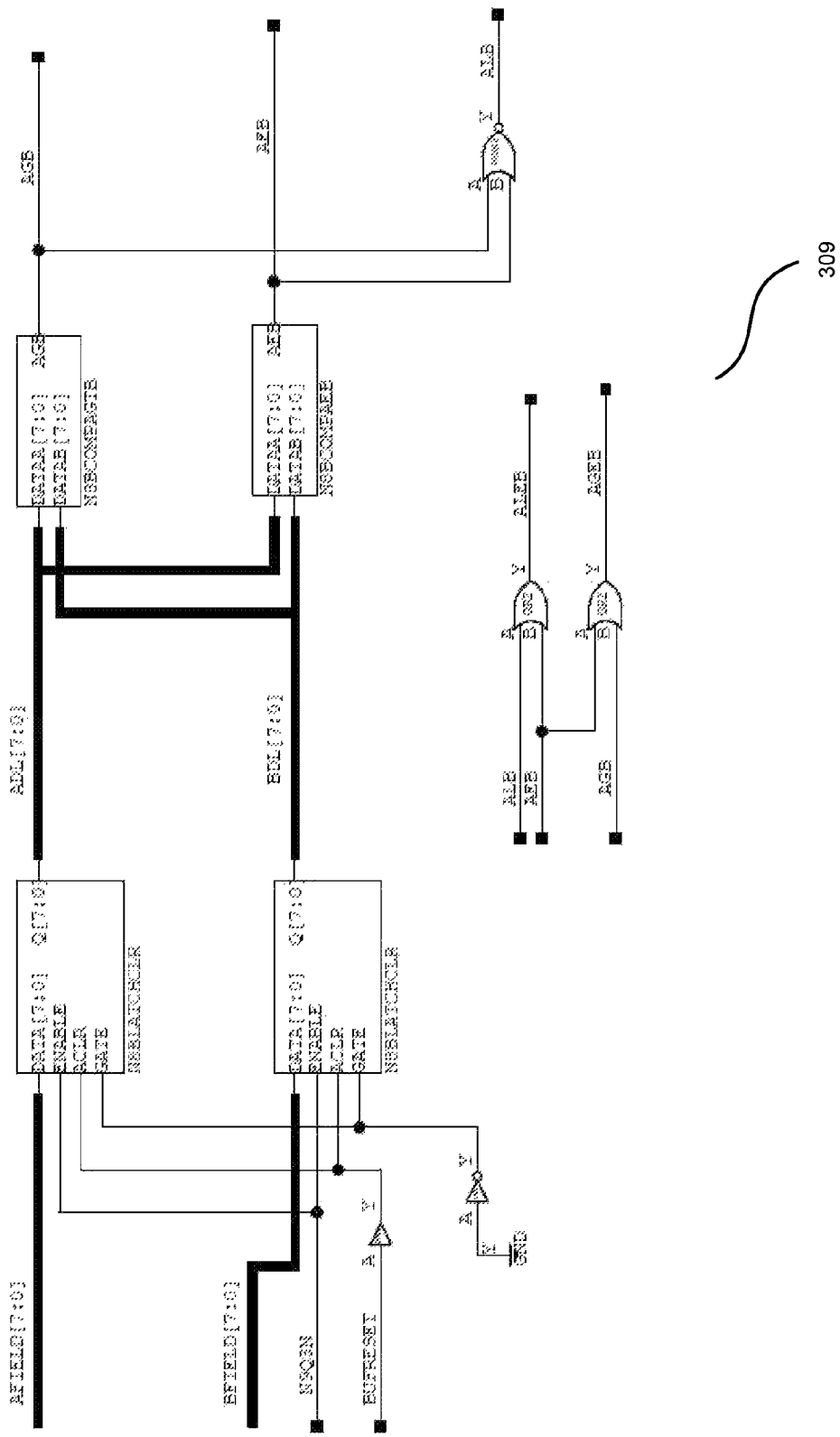

The compare engine 309 accesses data of the A and B fields such that it can compare any two data values from multiple data sources in a single clock cycle. An example of the compare engine 309 is illustrated in FIG. 19. As shown in FIG. 19, the compare engine 309 provides for comparison operations without the use of an accumulator. Such reduces logic gates by not running compares through the ALU 308. This also reduces clock cycles by using single cycle comparisons for all possible data source. A and B field data latches hold data read from A and B field buses 322 and 323, respectively, to the compare engine 309. Thus, the compare engine 309 is operable to connect the A and B field buses 322 and 323 to various components within the CCISC processor 102 including onboard peripherals 311 and their various inputs and outputs. In one embodiment, the compare engine 309 uses and 8-bit magnitude comparator to provide results of the six standard comparisons: <, =, >, <=, !=, and >= of the A and B field data.

Figure 20:
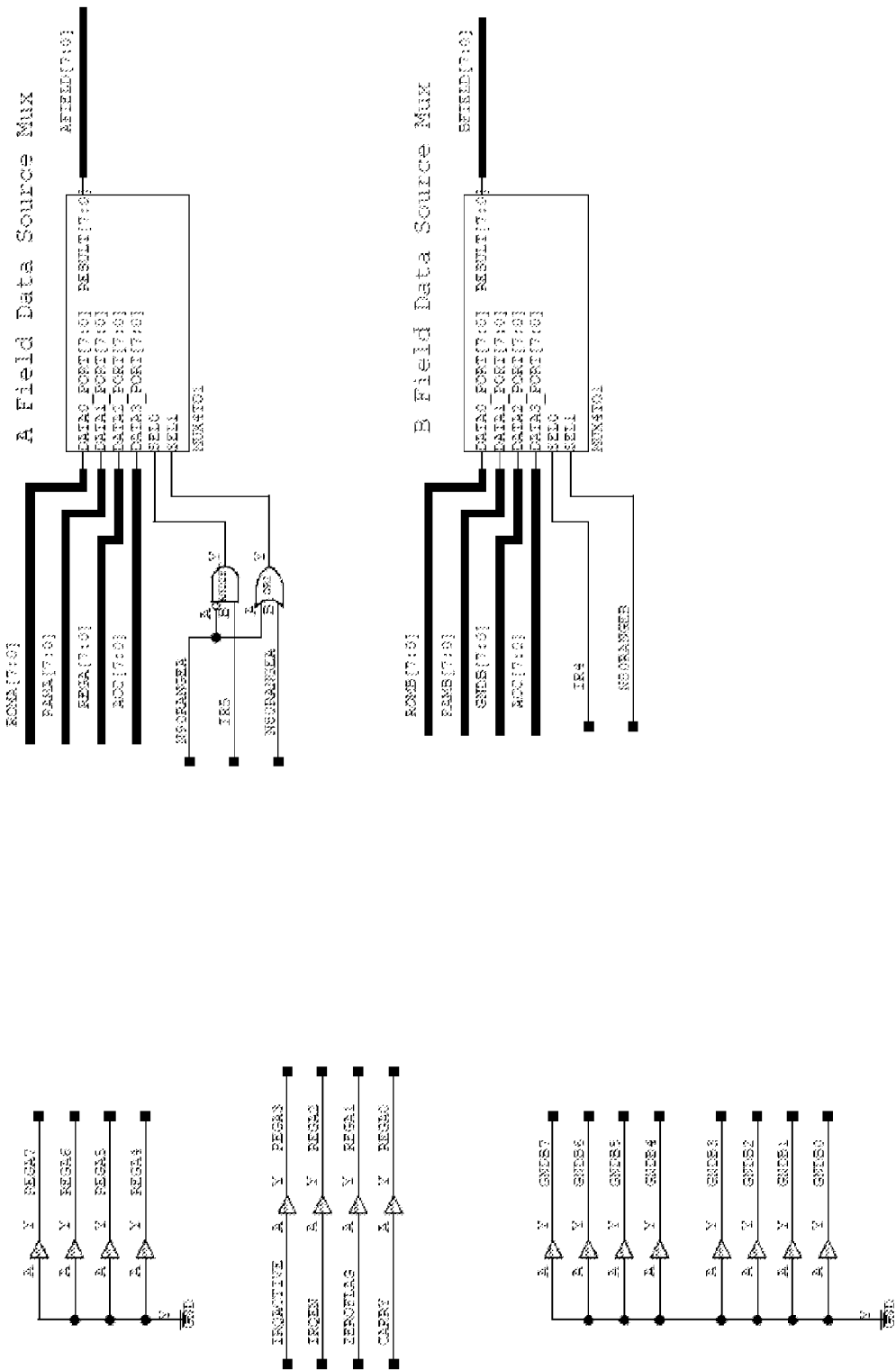

FIG. 20 illustrates the multiplexing of the A and B data fields. That is, various A field data and B field data sources are multiplexed onto the A and B field buses 322 and 323. For example, A field data from an A field data source, such as ROM A data from the A field of the program memory 101, RAM A data from RAM 303A (including address accessible features), register data from multiple registers in RAM A address space, and accumulator data from an accumulator driven onto the A field bus 322. Similarly, B field data sources may be obtained from ROM B data from B field of the program memory 101, RAM B data from RAM 303B (including address accessible features), a system buffer, and accumulator data from an accumulator driven onto the B field bus 323.

Figure 21:
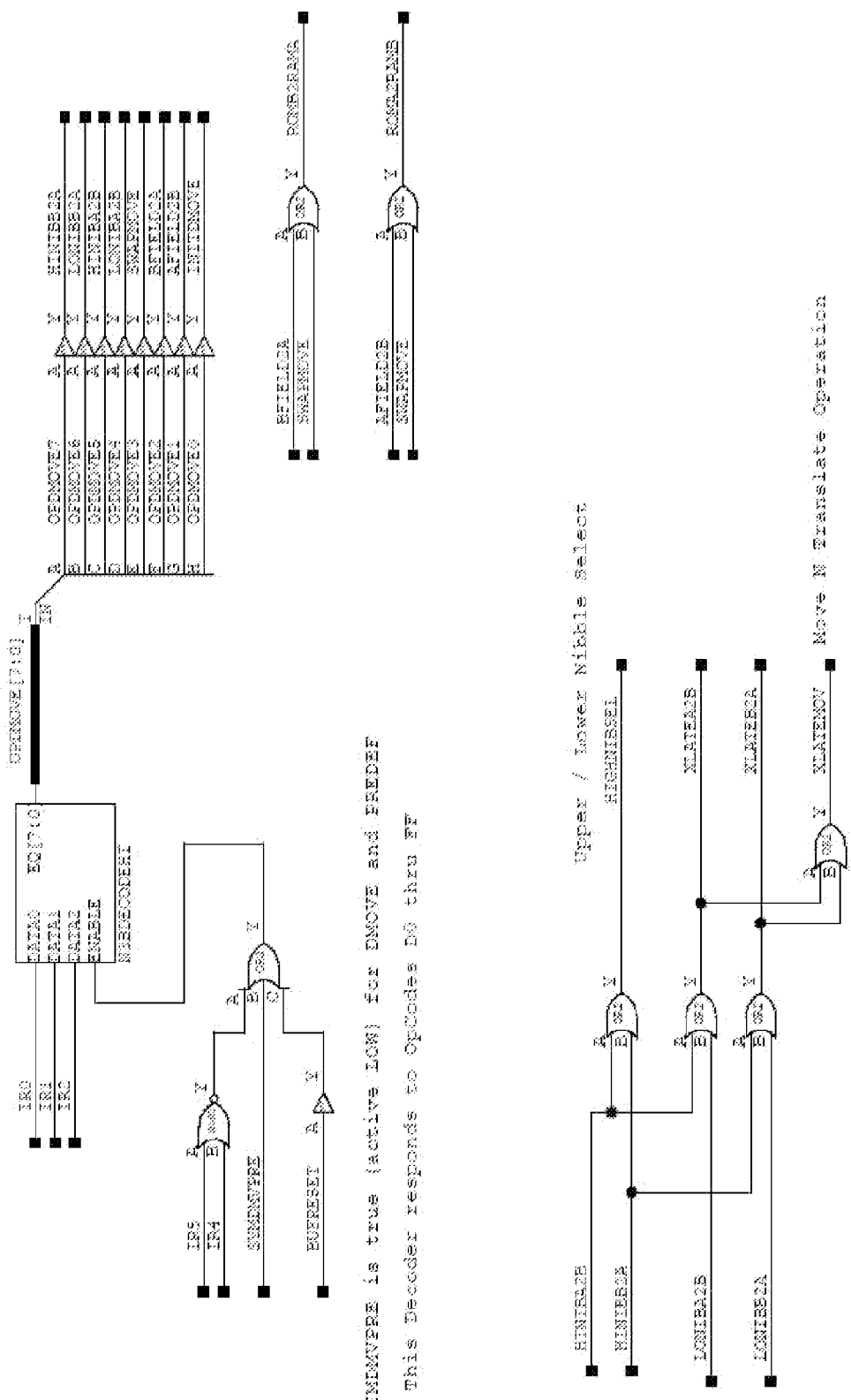

FIG. 21 illustrates DMOVE instructions that are decoded, including the decoding of move and translate DMOVE instructions, and for moves relating to the loading of address range activated registers in the RAM 303A and 303B. The DMOVE provides data movement from any A sources to B destinations and from any B sources to A destinations. The CCISC instructions also provide for swapping A and B data via a SWAP instruction. In this embodiment, move and translate DMOVE instructions provide for A and B address ranges in upper and lower nibbles. The register bank I/O 310 provides a memory map of the RAM A address space, from 0x80 to 0xFF in one embodiment.

Figure 22:
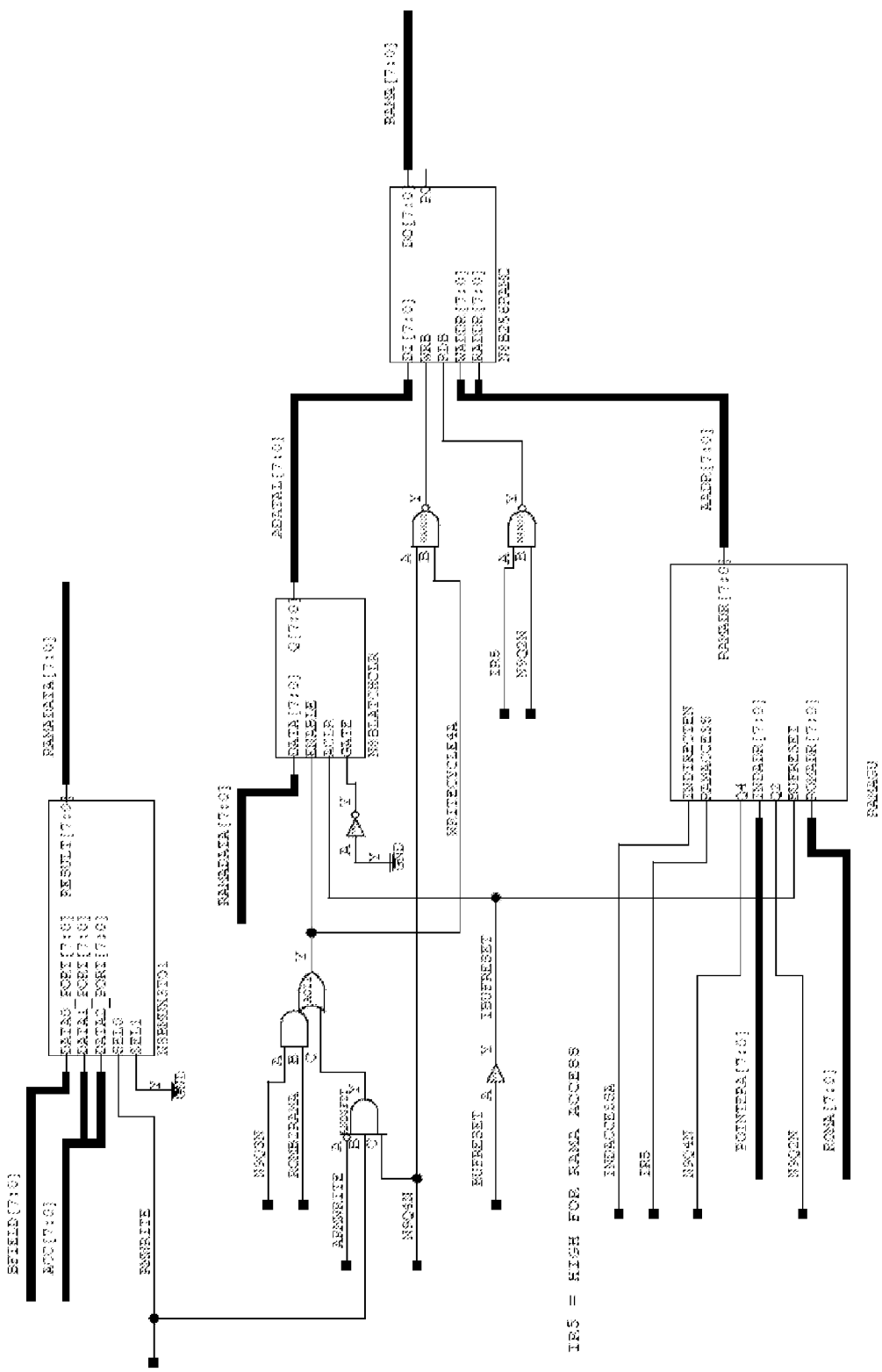
Figure 23:
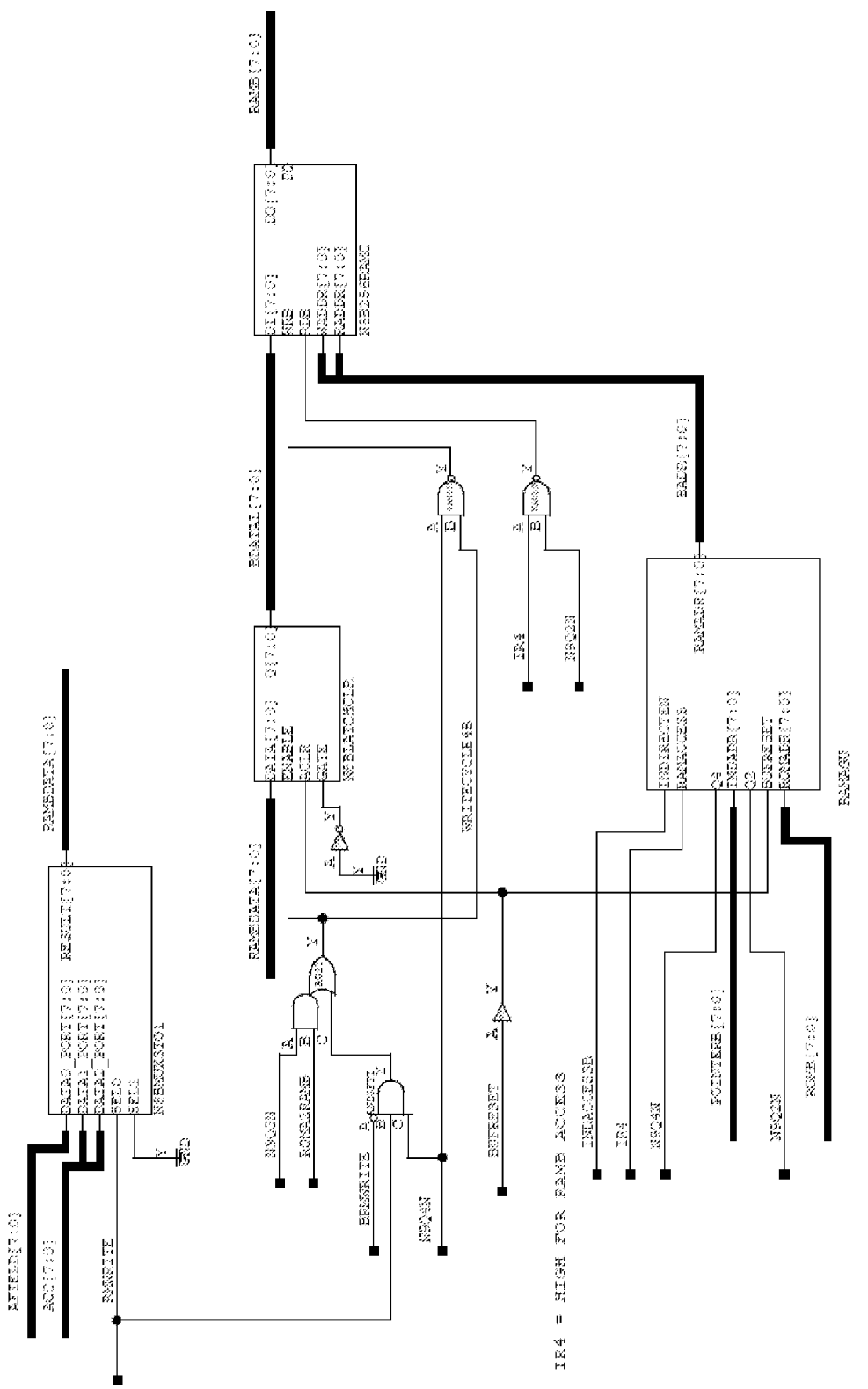

The A field, B field, and link field data/address fields connect to the register bank I/O 310 with the A field for being used for data transfer, the B field being used for data and addressing, and the link field being used for addressing and offset addressing. The register bank 310 may also provide a system buffer in the RAM 303B address space. Examples of such are illustrated in FIGS. 22 and 23 for the A and B data fields, respectively, using the previously mentioned 256×8 RAM of which 128 are directly addressable and 128 are indirectly addressable.

Figure 24:
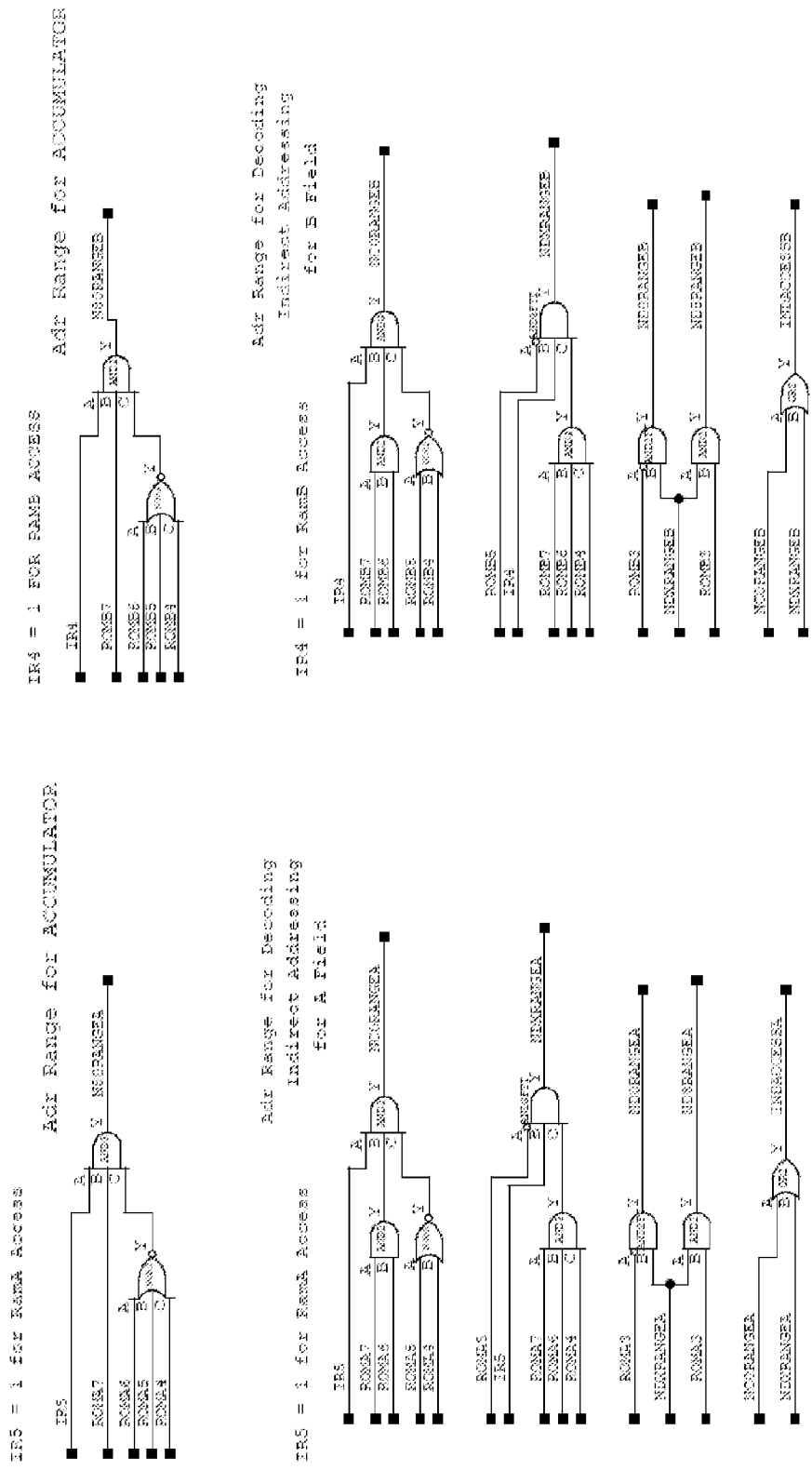

FIGS. 24-36 illustrate various exemplary implementations of some of the functional aspects of the components described above. FIG. 24 illustrates how the above-mentioned address range activated features of the RAM 303A and 303B may be implemented. For example, the address range activated features of the RAM 303A and 303B address spaces may allow for independent decoding by the ALU 308 of the RAM address spaces thus providing for simultaneous and compound use of the address spaces.

Figure 25:
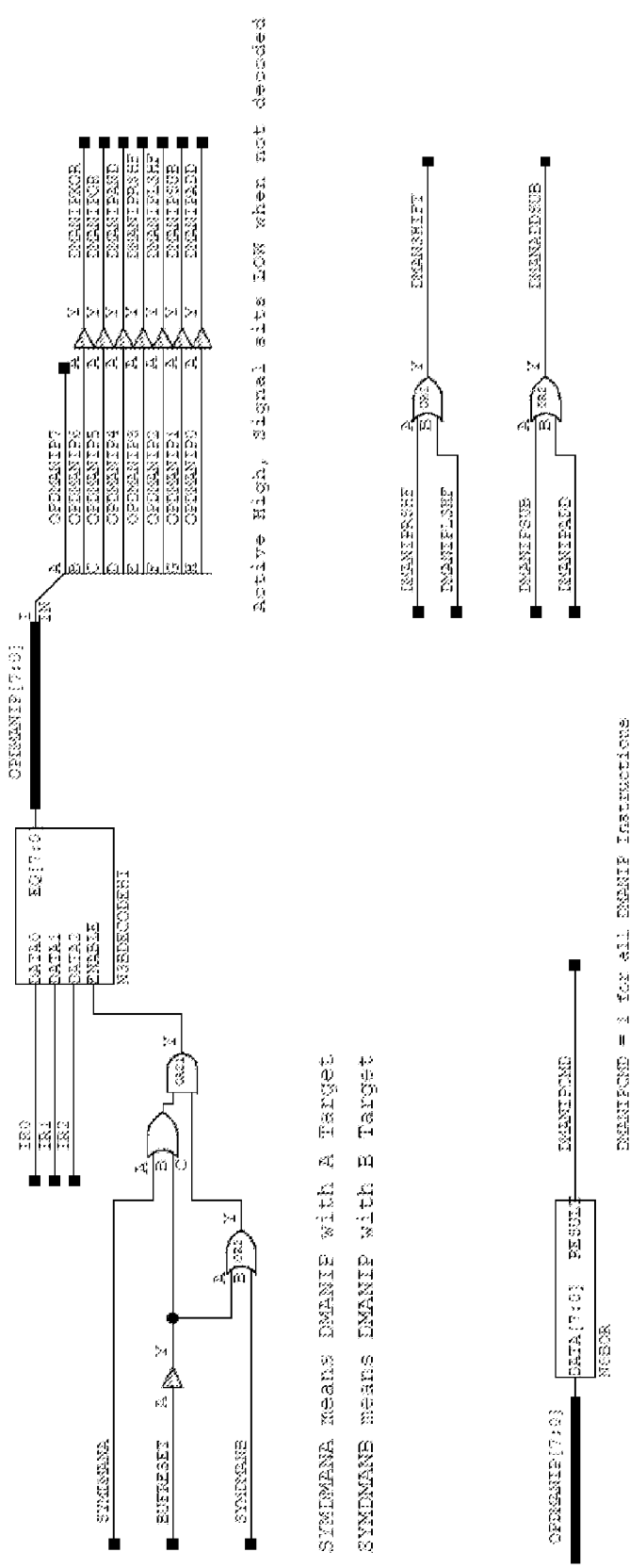
Figure 26:
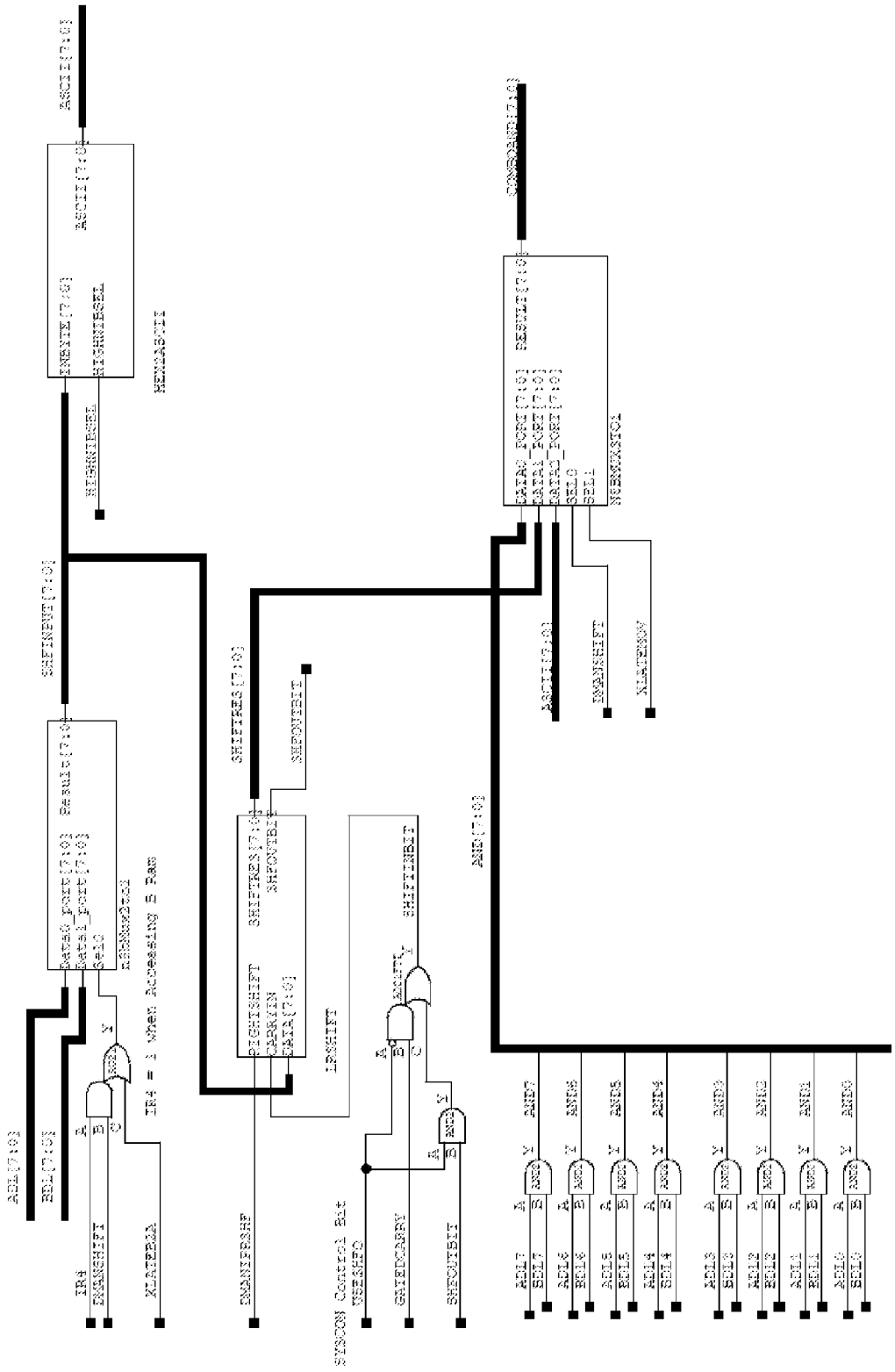
Figure 27:
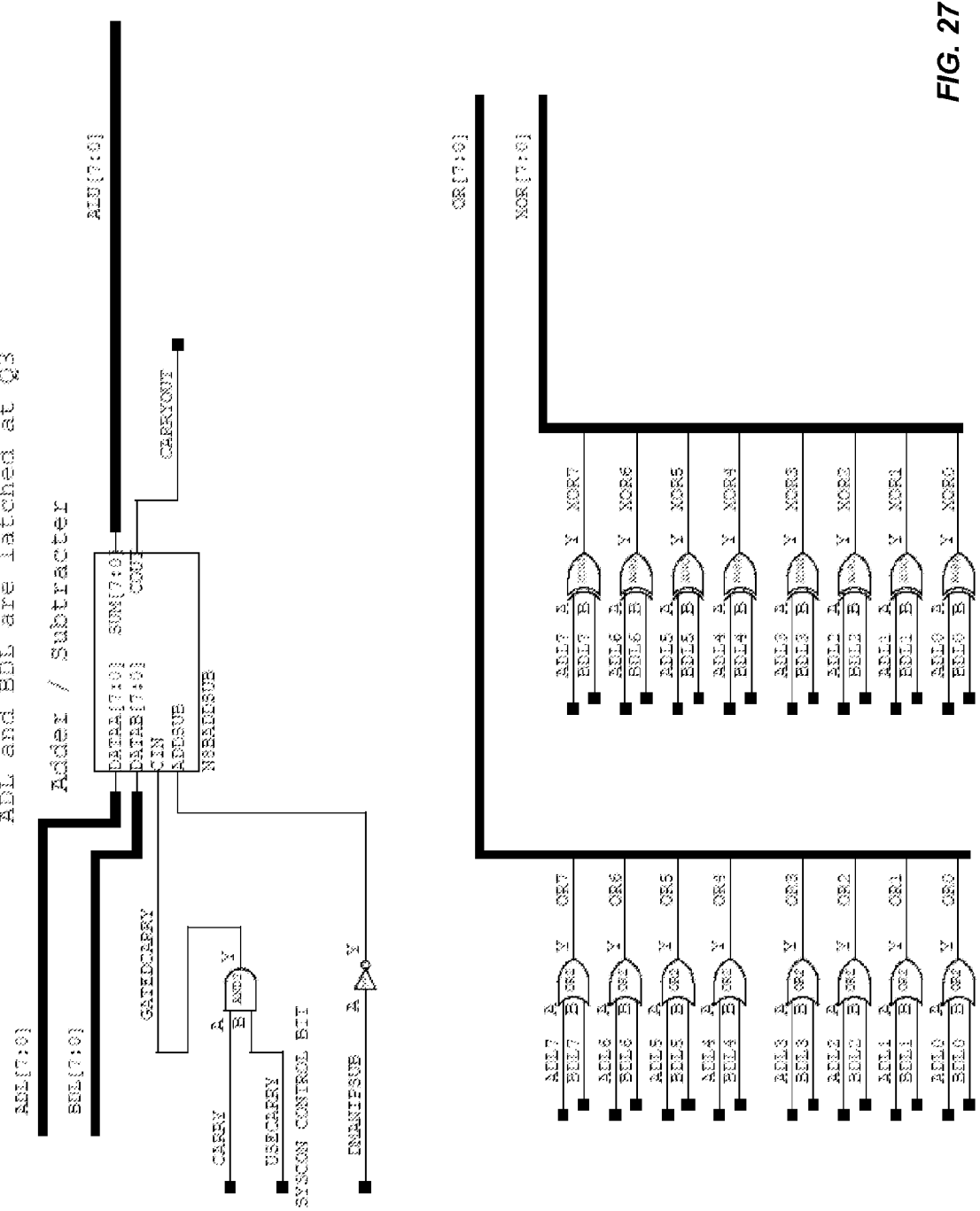

FIG. 25 illustrates how the ALU 308 may decode DMANIP instructions including add, subtract, left shift/rotate, and right shift/rotate operations as well as the logical AND, OR, XOR operations. FIG. 26 illustrates how the ALU 308 may implement the left/shift rotate, the right shift/rotate, and the logical AND operations as well as the DMOVE operations (i.e., move and translate). The move and translate section includes the A and B data fields for the shift and DMOVE operations. In this embodiment, the ALU 308 is operable to translate upper and lower 4-bit hex nibbles from the A and B data fields into 8-bit ASCII using a single DMOVE instruction in one clock cycle. FIG. 27 illustrates an 8-bit adder/subtractor module that is operable to add, subtract, and provide logical OR and logical XOR operations.

Figure 28:
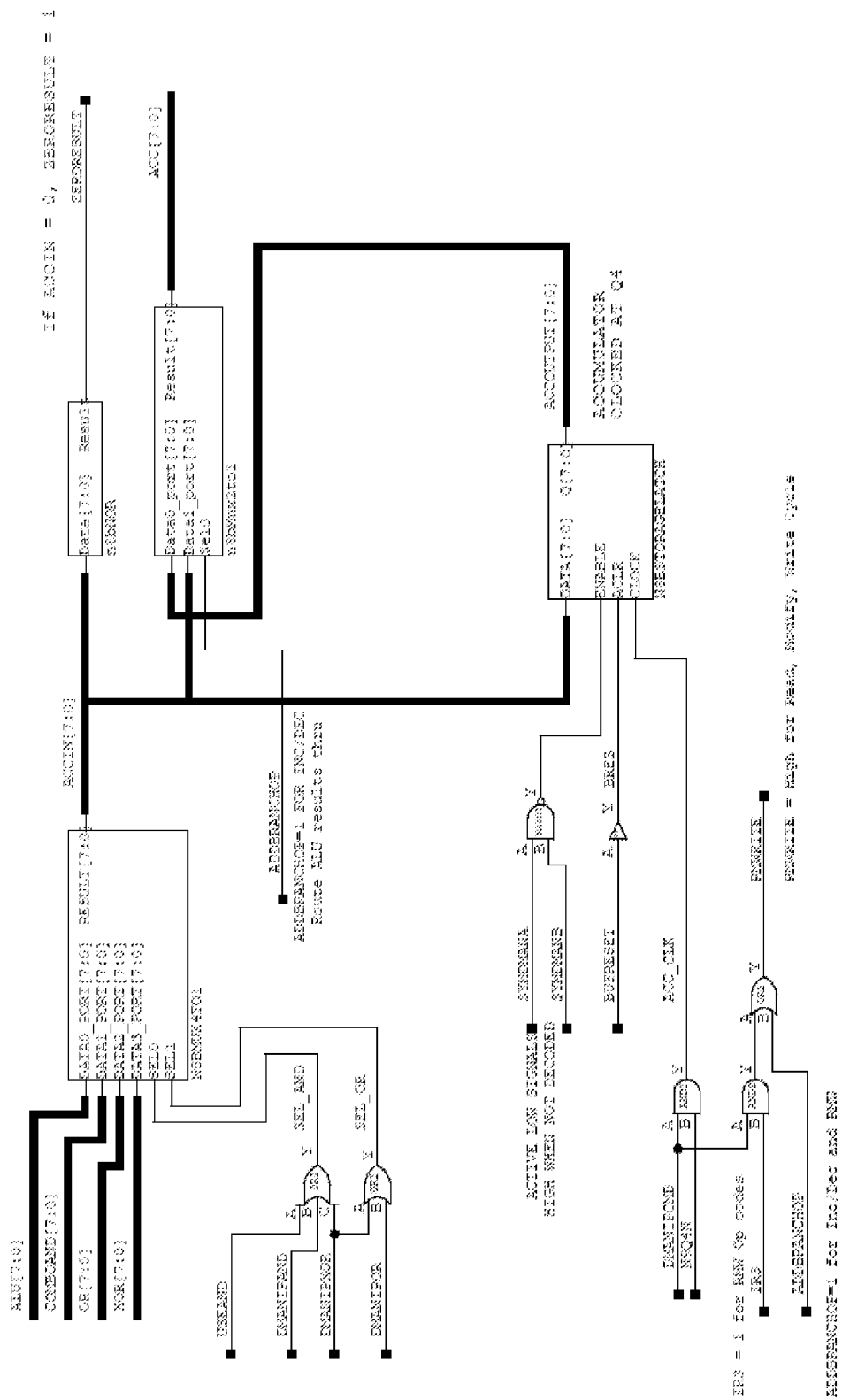
Figure 29:
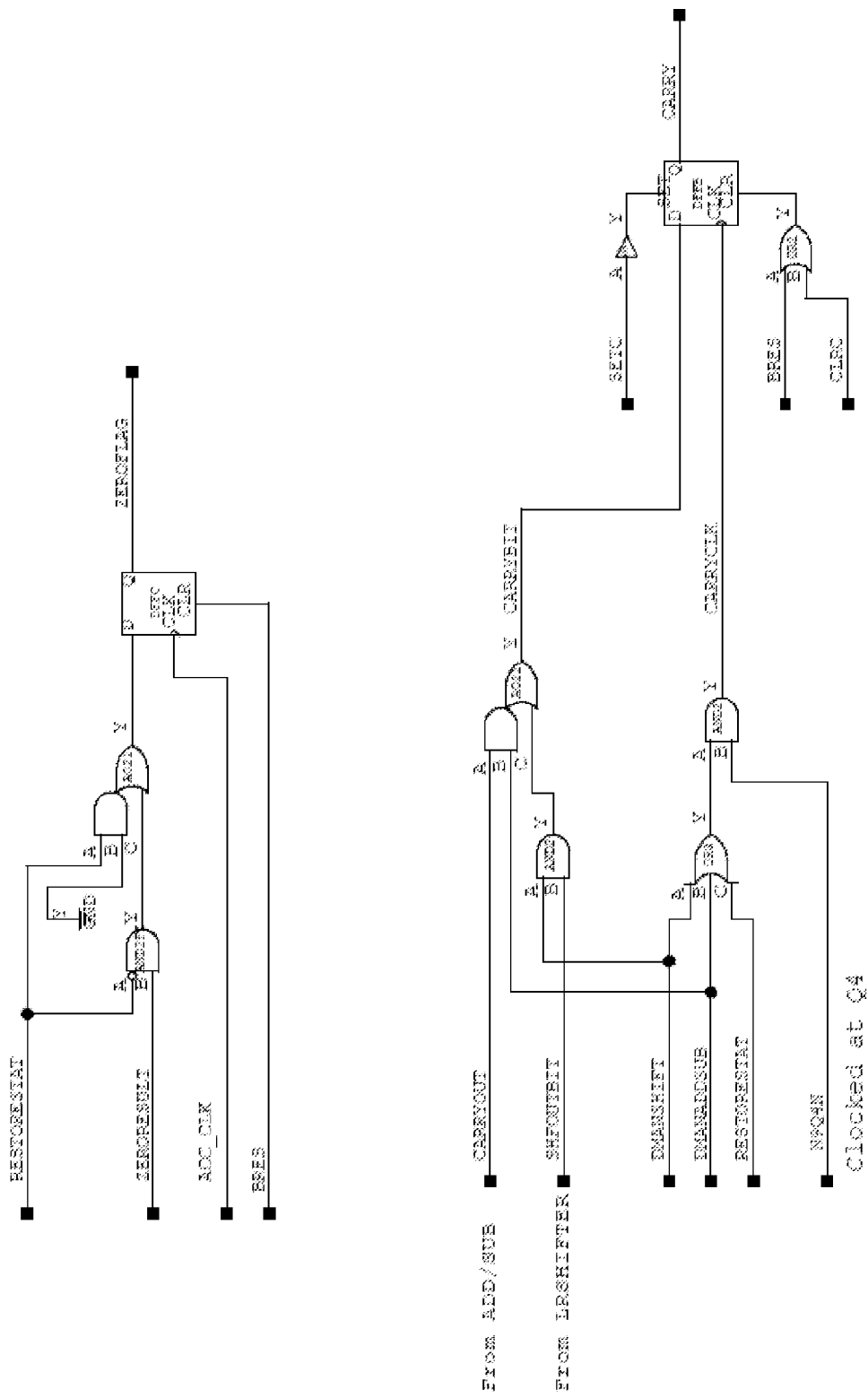

FIG. 28 illustrates accumulator functionality of the ALU 308. This functionality provides the ALU 308 with ability to route data mux results of the ALU 308 to various components including the RAMs 303A and 303B. FIG. 29 illustrates zero flag and carry flag functionality of the ALU 308 which may be used to indicate results of the operations of the ALU 308.

Figure 30:
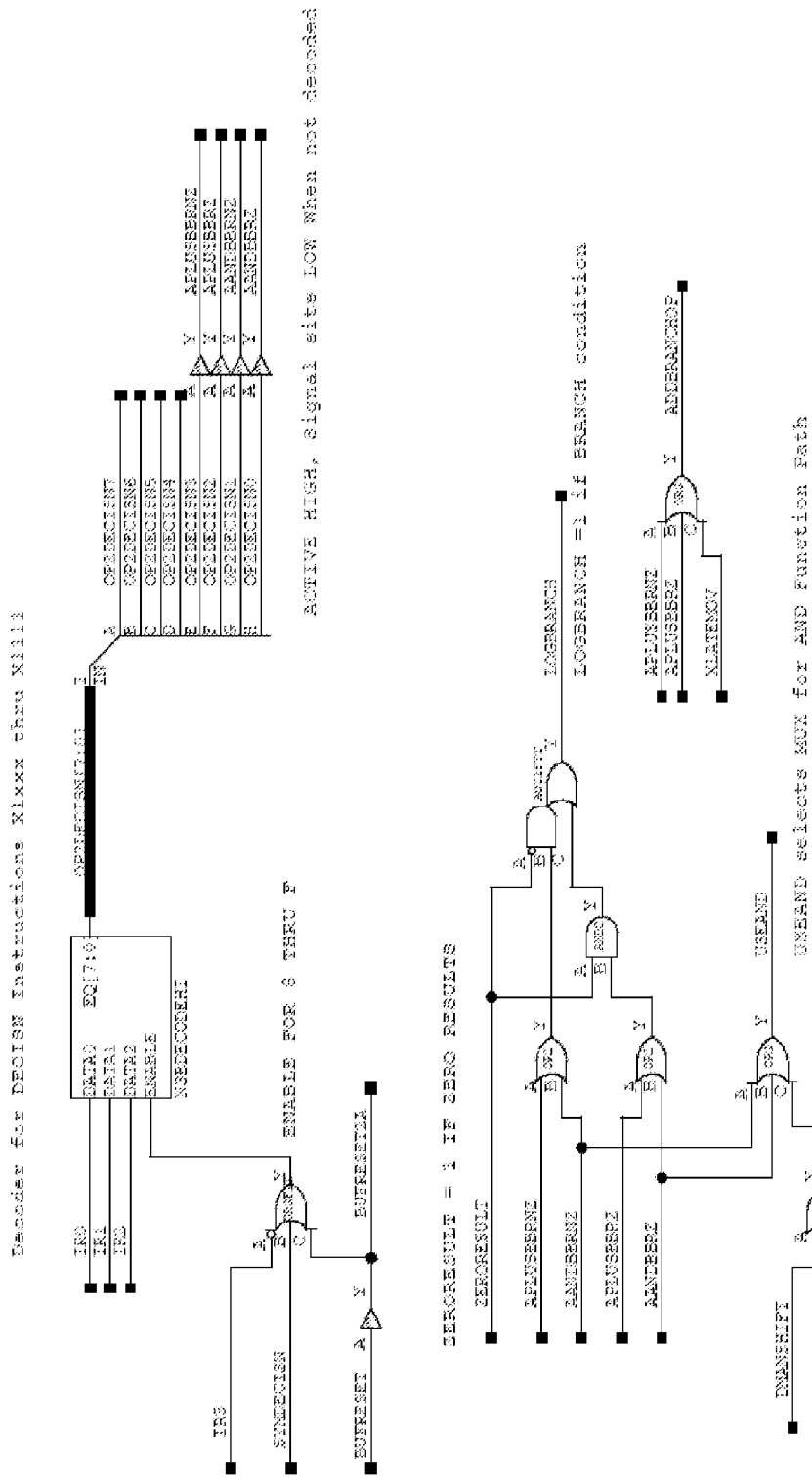

FIG. 30 illustrates decoding of decision operations by the decoder/CPU controller 305. The decoder/CPU controller 305 is operable to decode bit testing and auto-count testing of CCISCs decisions as well as including bit testing and auto-count testing branch control logic.

Figure 31:
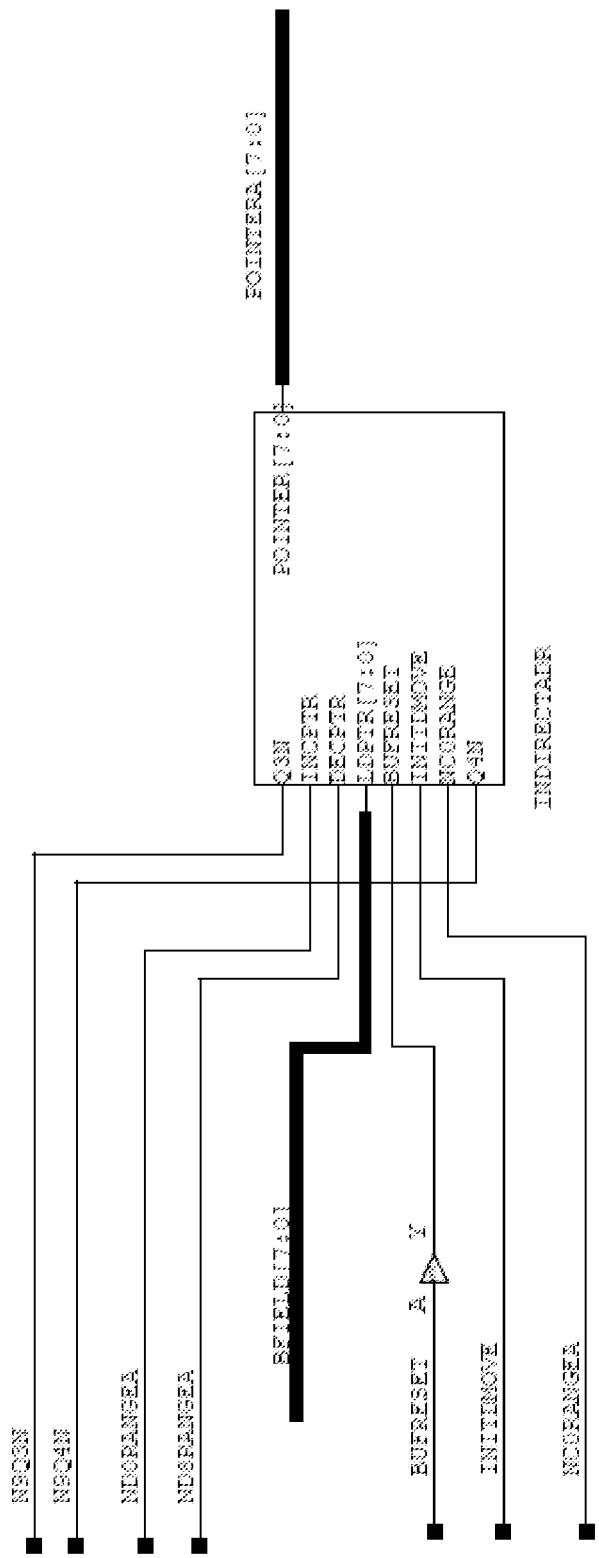
Figure 32:
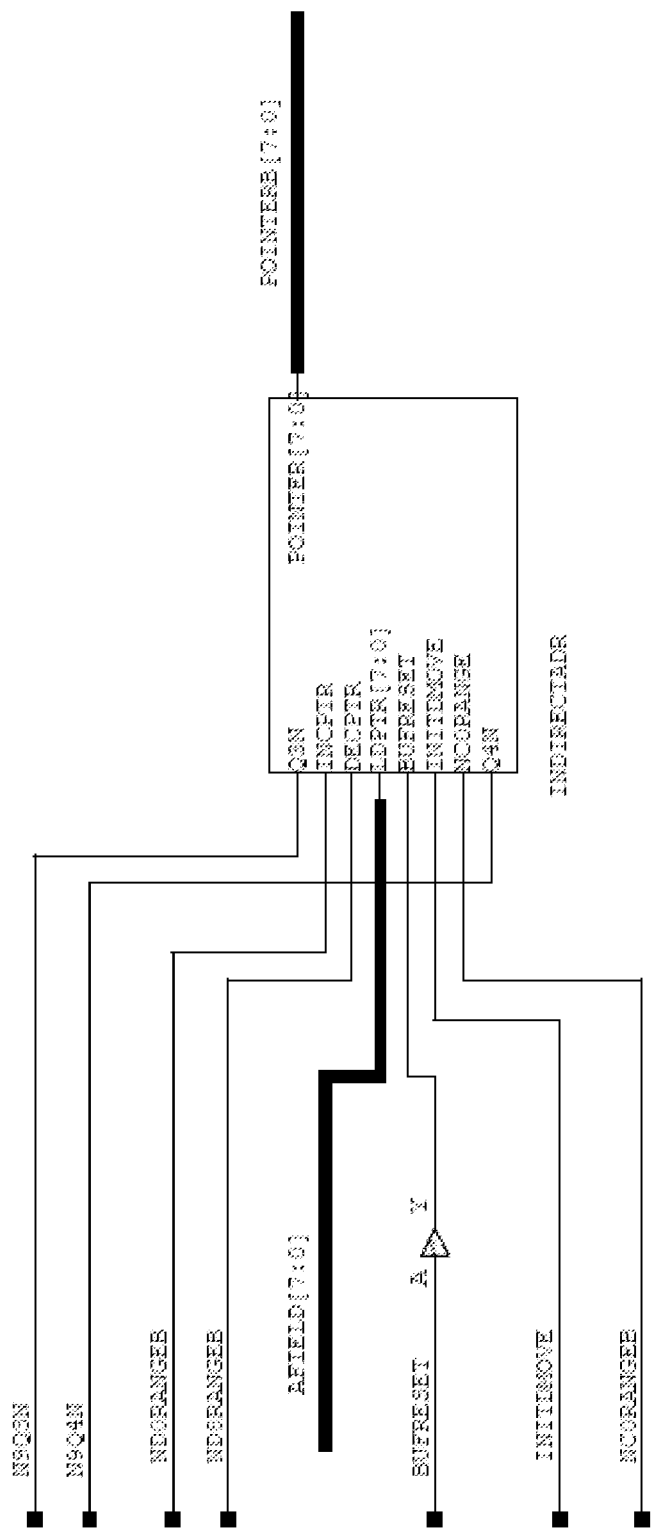

FIG. 31 illustrates an indirect pointer A register, part of the RAM AGU 312 that indexes the RAM A address space of the RAM 303A. This functionality provides control of pre and post increment/decrement of pointer register values. FIG. 32 illustrates an indirect pointer B register, part of the RAM AGU 312 that indexes the RAM B address space of the RAM 303B, also providing control of pre and post increment/decrement of pointer register values.

Figure 33:
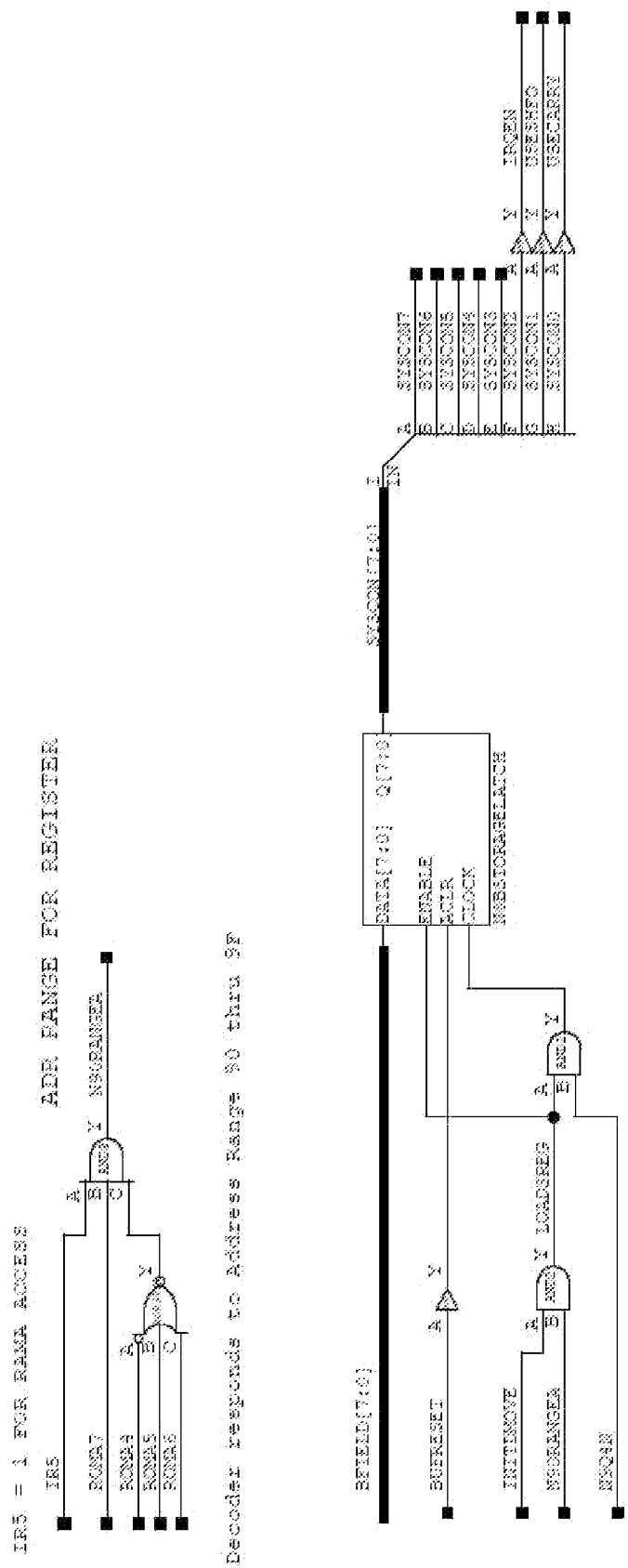

FIG. 33 illustrates system control register functionality of the CCISC processor 102, including decoding for the register, configuring CARRYs in various operations, controlling configurations of shifters, and enabling and disabling interrupts.

Figure 34:
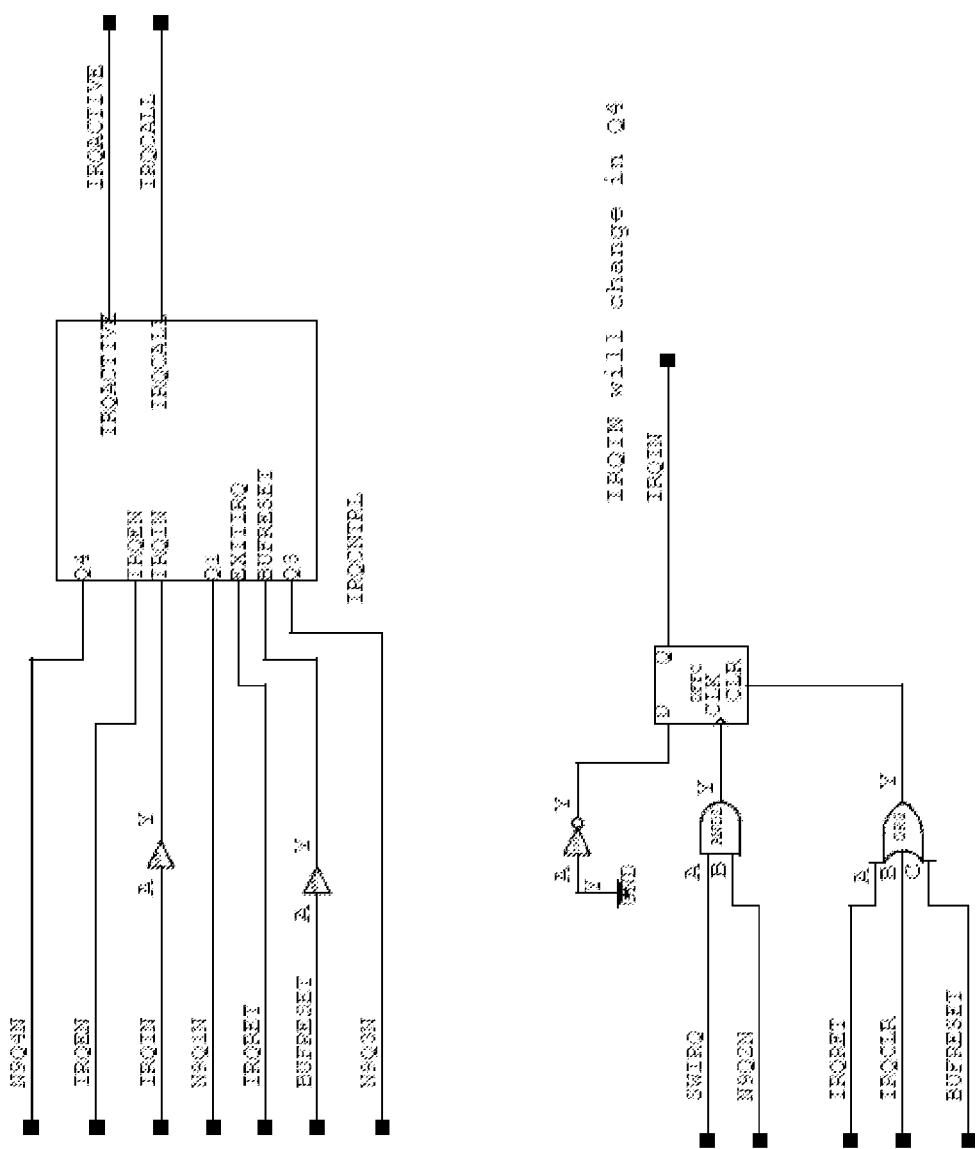
Figure 35:
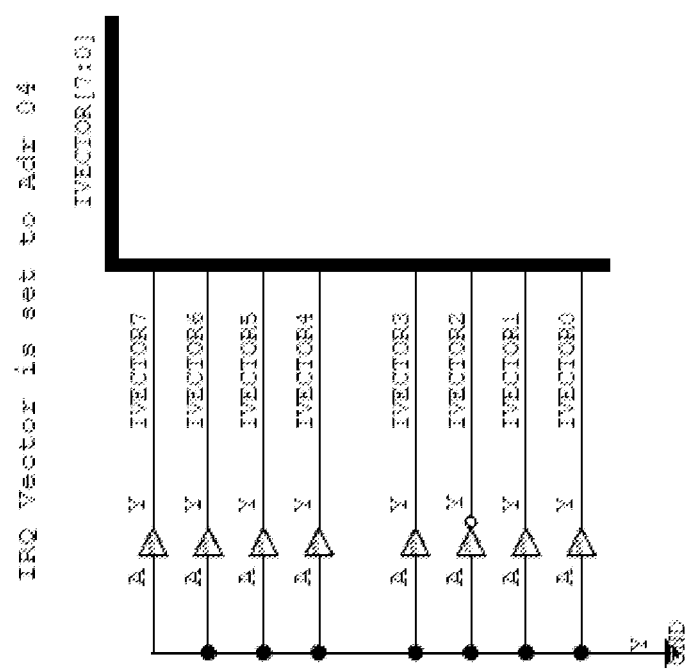

FIG. 34 illustrates an interrupt request state machine that synchronizes an interrupt event's edge with the clock 302. The state machine also controls the active state of interrupts by activating an interrupt address vector and the AGU 306. FIG. 35 illustrates an interrupt request address vector and mux that maintains the interrupt request vector address values. Generally a single vector is employed at any given time but other vector addresses can be muxed together.

Figure 36:
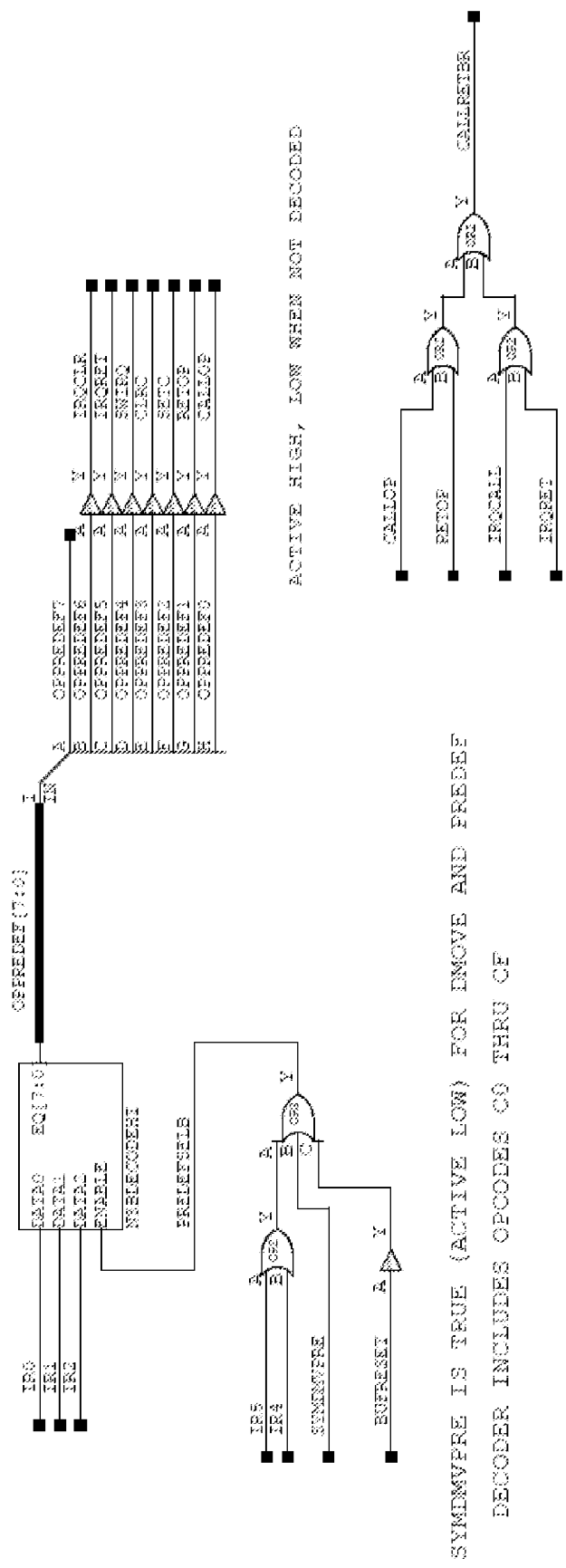

FIG. 36 illustrates predefined decodes used by the decoder/CPU controller 305 to decode CALL, RETURN, Decodes Set CARRY, and Clear CARRY CCISC instructions. This functionality also provides for decoding software interrupt instructions and interrupt request returns for exiting interrupt modes of operation, as well as an enabling and disabling interrupts via an IRQCLR.

Figure 37:
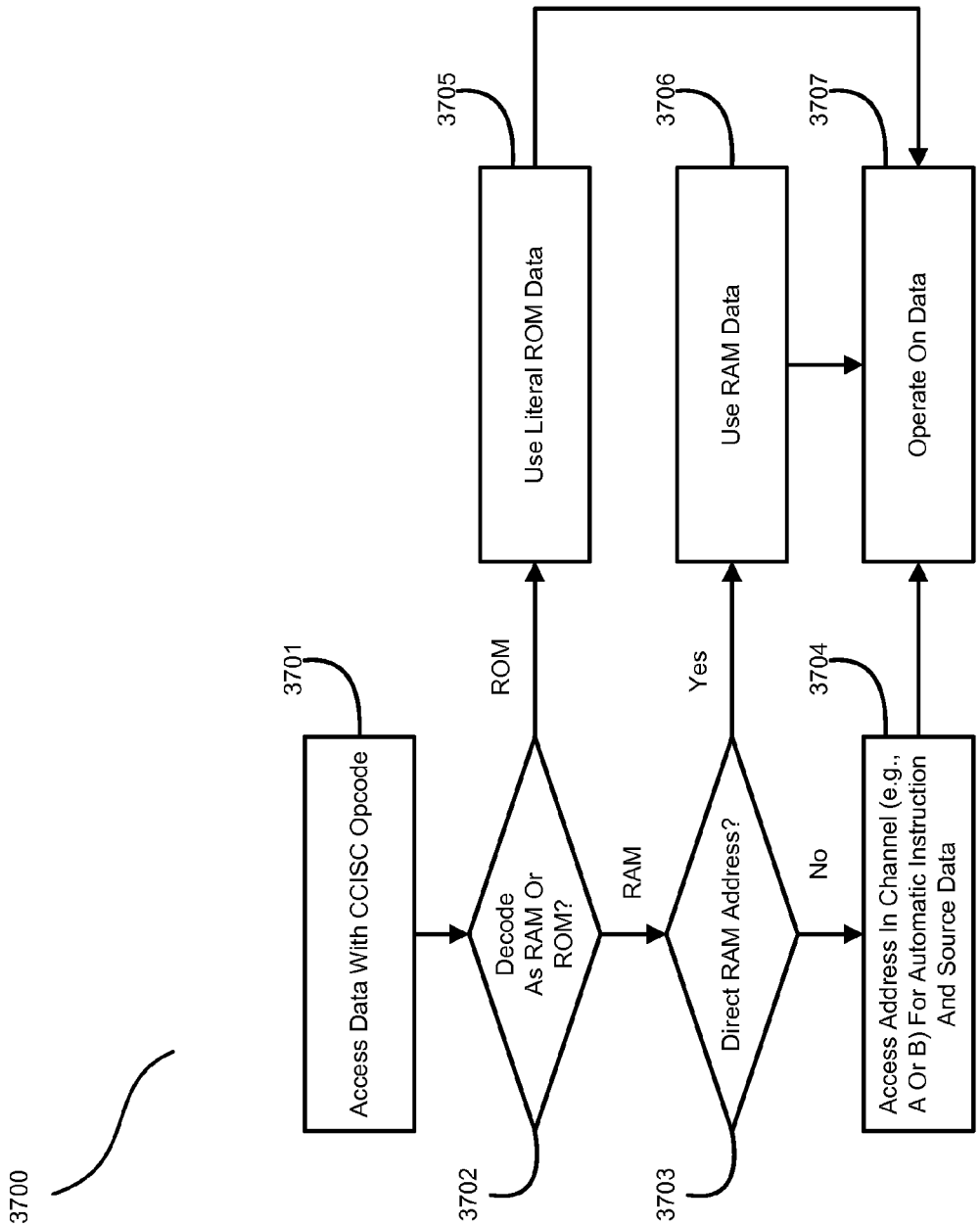
FIG. 37 is a flowchart illustrating another embodiment of the CCISC opcode processing.

FIG. 37 is a flowchart 3700 illustrating another embodiment of the CCISC opcode processing. In this embodiment, the flowchart 3700 illustrates how a data source is determined for both the channel A data field and the channel B data field during the CCISC opcode decoding and prior to instruction execution. For the purposes of this embodiment, it is assumed that the CCISC processor received a CCISC opcode from program memory containing the A field, the B field, the opcode field and the link field. In this regard, the CCISC processor accesses data with the CCISC opcode in the process element 3701. It should be noted that the flowchart 3700 is generally applicable to both the channel A field and the channel B field. The data source determination action for the A field and the B field are "compounded" and happen in parallel with opcode decoding. It should also be noted that each CCISC opcode contains two bit flags to indicate whether the A field data and the B field data represents "literal data" (referred to as ROM) or represents an "Address" (referred to as RAM).

The CCISC processor, based on opcode decoding, determines whether the data in the A and the B fields decoded as ROM (i.e., literal data) or RAM (i.e., addressable variable data), in the process element 3702. If the data in the A field is decoded as ROM, the CCISC processor uses the A field data as a literal data constant, in the process element 3705. The source of data for channel A is the data given in the A field from program memory 101.

If the data in the A field is decoded as RAM, the CCISC processor determines that the A field data represents an address value and determines where the address is located, in the process element 3706 (e.g., between 0x00 to 0x7f or 0x80 to 0xff). That is, the CCISC processor determines that the A field contains an address in the range of 0x00 to 0x7f, which addresses RAM. The CCISC processor uses the A field data as an address to RAM A memory. The source of data for channel A comes from an appropriate RAM 103 memory location (e.g., A or B).

If the data in the A field is decoded as an address in the range of 0x80 to 0xff, the CCISC processor addresses the address range activated features discussed above, in the process element 3704. The CCISC processor uses the A Field data as an address to address range activated features including multiple forms of indirect RAM 103 memory addressing and other automatic instructions, again depending on the source A or B. The CCISC processor operates on the data in the process element 3707.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. A processor system, comprising:
   a multichannel memory configured to store data values;
   a program memory configured to store Compound Complex Instruction Set Computer (CCISC) instructions; and
   a processor configured to execute a computer program assembled with at least a portion of the compound CCISC instructions, to retrieve a CCISC instruction from the program memory, to access at least two data values in the multichannel memory based on the executed computer program, and to operate on the at least two data values in the multichannel memory based on the CCISC instruction,
   wherein the processor retrieves the CCISC instruction, accesses the at least two data values, and performs and operation utilizing the at least two data values during a same clock cycle.

2. The processor system of claim 1, wherein:
   the processor, in performing the operation utilizing the at least two data values, is configured to compare the at least two data values to branch to an address in the program memory.

3. The processor system of claim 1, wherein:
   the processor, in performing the operation utilizing the at least two data values, is configured to change at least one of the data values in the multichannel memory.

4. The processor system of claim 1, wherein:
   the processor, in performing the operation utilizing the at least two data values, is configured to move at least one data value from a first address to a second address in the multichannel memory based on the CCISC instruction.

5. The processor system of claim 1, wherein:
   the processor is an 8-bit processor.

6. The processor system of claim 1, further comprising:
   an address generation unit configured to generate addresses to access the at least two data values in the multichannel memory.

7. A method, comprising:
   initiating execution of a program;
   storing data values in a multichannel memory based on the program; and
   during a same clock cycle:
      retrieving a Compound Complex Instruction Set Computer (CCISC) instruction from a program memory based on the program;
      accessing at least two data values in the multichannel memory based on the program; and
      performing an operation utilizing the at least two data values in the multichannel memory based on the CCISC instruction.

8. The method of claim 7, wherein:
   in performing the operation utilizing the at least two data values, the method further comprises comparing the at least two data values to branch to an address in the program memory.

9. The method of claim 7, wherein:
   in performing the operation utilizing the at least two data values, the method further comprises changing at least one of the data values in the multichannel memory.

10. The method of claim 7, wherein:
in performing the operation utilizing the at least two data values, the method further comprises moving at least one data value from a first address to a second address in the multichannel memory based on the CCISC instruction.

11. The method of claim 7, further comprising:
processing CCISC instruction with an 8-bit processor.

12. The method of claim 7, wherein:
accessing the at least two data values in the multichannel memory comprises generating addresses with an address generation unit to access the at least two data values in the multichannel memory.

13. A non-transitory computer readable medium embodying programmed instructions which, when executed by processor, direct the processor to:
initiate execution of a program;
store data values in a multichannel memory based on the program; and
during a same clock cycle:
retrieve a Compound Complex Instruction Set Computer (CCISC) instruction from a program memory based on the program;
access at least two data values in the multichannel memory based on the program; and
performing an operation utilizing the at least two data values in the multichannel memory based on the CCISC instruction.

14. The medium of claim 13, wherein:
in performing the operation utilizing the at least two data values, the instructions direct the processor to compare the at least two data values to branch to an address in the program memory.

15. The medium of claim 13, wherein:
in performing the operation utilizing the at least two data values, the instructions direct the processor to change at least one of the data values in the multichannel memory.

16. The medium of claim 13, wherein:
in performing the operation utilizing the at least two data values, the instructions direct the processor to move at least one data value from a first address to a second address in the multichannel memory based on the CCISC instruction.

17. The medium of claim 13, further comprising:
process CCISC instruction with an 8-bit processor.

18. The medium of claim 13, wherein:
in accessing the at least two data values in the multichannel memory, the instructions further direct the processor to generate addresses with an address generation unit to access the at least two data values in the multichannel memory.

* * * * *